(12) United States Patent
Wu

(10) Patent No.: US 12,096,425 B2
(45) Date of Patent: *Sep. 17, 2024

(54) TRANSMISSION METHOD FOR UPLINK CONTROL INFORMATION, AND USER EQUIPMENT

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,396

(22) Filed: Jul. 31, 2023

(65) Prior Publication Data
US 2023/0389016 A1 Nov. 30, 2023

Related U.S. Application Data

(63) Continuation of application No. 17/751,316, filed on May 23, 2022, now Pat. No. 11,785,596, which is a
(Continued)

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0057* (2013.01); *H04L 1/1812* (2013.01); *H04L 5/0055* (2013.01); *H04W 72/23* (2023.01)

(58) Field of Classification Search
CPC ... H04W 28/04; H04W 72/04; H04W 72/042; H04W 88/08; H04W 72/1268;
(Continued)

(56) References Cited

U.S. PATENT DOCUMENTS 11,388,739 B2 * 7/2022 Wu .................. H04L 5/0055
11,785,596 B2 * 10/2023 Wu .................. H04W 72/1268
370/329
(Continued)

FOREIGN PATENT DOCUMENTS

JP  2022549764  11/2022
WO 2021060952  4/2021

OTHER PUBLICATIONS

3GPP TSG RAN WG1 Meeting #98, Prague, CZ, Aug. 26-Aug. 30, 2019, R1-1909248, Agenda item: 7.2.2.2.4, Source: Qualcomm Incorporated, Title: Enhancement to configured grants in NR unlicensed. (Year: 2019).*

(Continued)

*Primary Examiner* — Peter G Solinsky
*Assistant Examiner* — Sanjay K Dewan
(74) *Attorney, Agent, or Firm* — Hodgson Russ LLP

(57) ABSTRACT

A transmission method for uplink control information (UCI) is provided. The method includes the following. Target UCI is mapped to a physical uplink shared channel (PUSCH).
(Continued)

---

A FIRST DEVICE MAPS TARGET UCI TO A PUSCH AND TRANSMITS THE PUSCH ON CG UPLINK RESOURCES, WHERE THE TARGET UCI INCLUDES AT LEAST TWO TYPES OF UCI, AND THE AT LEAST TWO TYPES OF UCI ARE ENCODED USING JOINT ENCODING — 501

A SECOND DEVICE RECEIVES THE PUSCH ON THE CG UPLINK RESOURCES AND OBTAINS THE AT LEAST TWO TYPES OF UCI BY DECODING THE TARGET UCI USING JOINT-DECODING — 502

The PUSCH is transmitted on configured grant (CG) uplink resources, where the target UCI includes at least two types of UCI, and the at least two types of UCI are encoded using joint encoding.

12 Claims, 13 Drawing Sheets

Related U.S. Application Data continuation of application No. 17/463,062, filed on Aug. 31, 2021, now Pat. No. 11,388,739, which is a continuation of application No. PCT/CN2019/109740, filed on Sep. 30, 2019.

(51) Int. Cl.
*H04L 1/1812* (2023.01)
*H04L 5/00* (2006.01)
*H04W 72/23* (2023.01)

(58) Field of Classification Search
CPC .... H04W 72/23; H04L 5/0007; H04L 1/0057; H04L 1/1812; H04L 5/0055
USPC .......................................................... 370/329
See application file for complete search history.

(56) References Cited

U.S. PATENT DOCUMENTS

| | | | |
|---|---|---|---|
| 2011/0310759 A1* | 12/2011 | Gerstenberger | H04L 5/001 370/252 |
| 2019/0081735 A1* | 3/2019 | Chen | H03M 13/13 |
| 2021/0100024 A1* | 4/2021 | Bang | H04W 72/21 |

OTHER PUBLICATIONS

3GPP TSG RAN WG1 Meeting #88bis, Spokane, USA Apr. 3-7, 2017, R1-1704800, Agenda item: 7.2.1.2.3.3, Source: Nokia Alcatel-Lucent Shanghai Bell, Title: UCI on sPUSCH. (Year: 2019).*
3GPP TSG RAN WG1 #98, Prague, CZ, Aug. 26-30, 2019, R1-1909476, Agenda item: 7.2.2.2.4, Source: vivo, Title: Feature lead summary on Configured grant enhancement. (Year: 2019).*
3GPP TSG RAN WG1 #99, Reno, USA, Nov. 18-22, 2019, R1-1912509, Source: OPPO, Title: On configured grant for NR-U, Agenda Item: 7.2.2.2.4. (Year: 2019).*
Samsung, "Enhancements on configured grant for NR-U," 3GPP TSG RAN WG1 #98bis, R1-1910462, Oct. 2019.
OPPO, "On configured grant for NR-U," 3GPP TSG RAN WG1 #99, R1-1912509, Nov. 2019.
JPO, Office Action for JP Application No. 2021-578045, Aug. 8, 2023.

* cited by examiner

TRANSMISSION METHOD FOR UPLINK CONTROL INFORMATION, AND USER EQUIPMENT

CROSS-REFERENCE TO RELATED APPLICATION(S)

This application is a continuation of U.S. application Ser. No. 17/751,316, filed May 23, 2022, which is a continuation of U.S. application Ser. No. 17/463,062, filed Aug. 31, 2021, which is a continuation of International Application No. PCT/CN2019/109740, filed Sep. 30, 2019. The entire disclosures of the above-identified applications are incorporated herein by reference.

TECHNICAL FIELD

Implementations of the present disclosure relates to the technical field of electronic devices, and in particular, to a transmission method for uplink control information (UCI), and a user equipment.

BACKGROUND

An unlicensed spectrum is allocated by a country and region and available for communication of radio devices. The spectrum is generally considered as a shared spectrum, namely communication devices in different communication systems may utilize the spectrum without applying to the government for dedicated spectrum grants, as long as the regulatory requirements made by the country or region for the spectrum are met.

To enable various communication systems, which perform wireless communication by utilizing an unlicensed spectrum, to coexist on the unlicensed spectrum friendly, some countries or regions have made regulatory requirements that need to be satisfied during use of the unlicensed spectrum. For example, a communication device follows a listen before talk (LBT) rule. That is, the communication device needs to firstly perform channel listening, before sending a signal on a channel in an unlicensed spectrum, and the communication device can send a signal only if a channel listening result indicates that the channel is idle. If the channel listening result of the communication device for the channel in the unlicensed spectrum indicates that the channel is busy, the communication device may not send a signal. Moreover, to ensure fairness, during each time of transmission, a duration in which the communication device performs signal transmission using the channel in the unlicensed spectrum may not exceed a maximum channel occupancy time (MCOT).

SUMMARY

Implementations of the present disclosure provide a transmission method for uplink control information (UCI), and a user equipment. According to the technical solutions, more UCI resources can be carried.

According to a first aspect, implementations provide a transmission method for UCI. The method includes the following.

Target UCI is mapped to a physical uplink shared channel (PUSCH). The PUSCH is transmitted on configured grant (CG) uplink resources, where the target UCI includes at least two types of UCI, and the at least two types of UCI are encoded using joint encoding.

According to a second aspect, implementations provide a transmission method for UCI. The method includes the following.

A PUSCH is received on CG uplink resources, where the PUSCH includes target UCI, the target UCI includes at least two types of UCI, and the at least two types of UCI are encoded using joint encoding. The at least two types of UCI are obtained by decoding the target UCI using joint-decoding.

According to a third aspect, implementations provide a user equipment. The user equipment includes a transceiver, at least one processor, and a memory. The memory is coupled to the at least one processor and stores at least one computer executable instruction thereon.

The at least one computer executable instruction, when executed by the at least one processor, causes the at least one processor to map target UCI to a PUSCH. The at least one computer executable instruction, when executed by the at least one processor, causes the transceiver to transmit the PUSCH on CG uplink resources, the target UCI comprising at least two types of UCI, and the at least two types of UCI being encoded using joint encoding.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
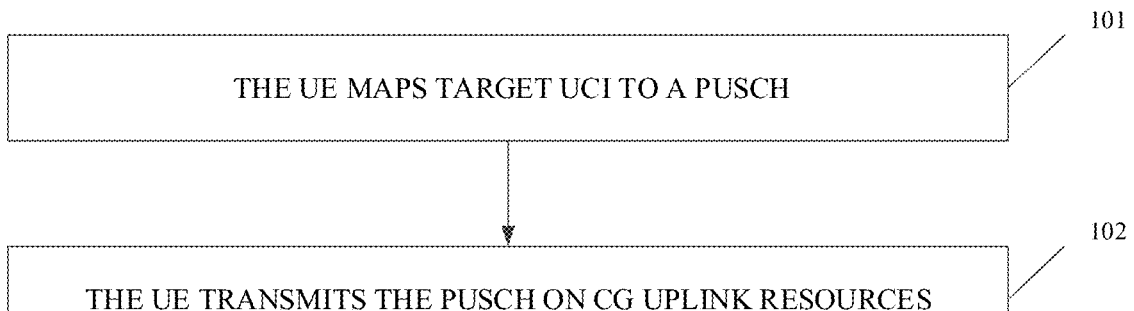
FIG. 1 is a schematic flow chart illustrating a transmission method for uplink control information (UCI) according to implementations.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second" and the like used in the specification and the claims of the present disclosure and the above-mentioned accompany drawings are used to distinguish different objects rather than describe a particular order. Additionally, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The implementations of the present disclosure can be applied to various communication systems, such as a global system of mobile communication (GSM), a code division multiple access (CDMA) system, a wideband code division multiple access (WCDMA) system, general packet radio service (GPRS), a long term evolution (LTE) system, an advance long term evolution (LTE-A), a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a wireless local area network (WLAN), wireless fidelity (Wi-Fi), a next-generation communication or other communication systems.

Generally, connections supported by a related communication system are usually limited in number and are also easy to implement. However, with development of communication technologies, a mobile communication system can not only support related communication but also support, for example, device-to-device (D2D) communication, machine-to-machine (M2M) communication, machine-type communication (MTC), and vehicle-to-vehicle (V2V) communication. The implementations herein can be applied to these communication systems.

The communication system in the implementations can be applied to a carrier aggregation (CA) scenario, a dual connectivity (DC) scenario, and a standalone (SA) networking scenario.

The frequency spectrum to which the implementations are applied is not limited. For example, the implementations can be applied to the licensed spectrum or the unlicensed spectrum.

The user equipment (UE) in the implementations can be an electronic device capable of data transmission. The electronic device may include various handheld devices, in-vehicle devices, wearable devices, computing devices that have wireless communication functions, or other processing devices connected to a wireless modem, as well as various forms of UE, mobile stations (MS), terminal devices, and the like. Hereinafter, the implementations will be interpreted in detail.

The network device in the implementations may be a device at the network side, such as a base station, an access point, and so on.

In an NR system, physical uplink shared channel (PUSCH) transmission not only supports a downlink feedback information-scheduled-orthogonal frequency division multiplexing (DFT-S-OFDM) waveform, but also supports a cyclic prefix-OFDM (CP-OFDM) waveform. However, mapping rules for uplink control information (UCI) to the PUSCH via these two waveforms are the same.

Types of UCI carried on the PUSCH include: hybrid automatic repeat-request acknowledgement (HARQ-ACK) and/or channel state information (CSI), excluding scheduling request (SR). In order to ensure transmission reliability of the HARQ-ACK, the HARQ-ACK and the CSI are encoded independently. When the CSI includes two parts, i.e., CSI Part 1 and CSI Part 2, the two parts are also independently encoded, which aims to ensure transmission of the CSI Part 1 with higher reliability requirements.

For an adopted channel coding, a solution of UCI transmission on the PUSCH is the same as that on a physical uplink control channel (PUCCH). That is, when the number of bits of the UCI is greater than 11 bits, a Polar code is used for encoding; when the number of bits of the UCI is less than or equal to 11 bits, a short code such as a Reed-Muller (RM) code is used for encoding.

Since the length of a bit sequence after the channel coding is unable to meet the requirements of the number of all resource elements (REs) used for actual mapping, the bit sequence after the channel coding needs to be adjusted adaptively through rate matching, so that the bit sequence after the channel coding can be mapped to all allocated REs. This process is achieved through the rate matching.

The rate matching for UCI transmission on the PUSCH is used for two cases: the PUSCH carrying uplink data and the PUSCH carrying no uplink data.

In the case of the PUSCH carrying uplink data, for the number of REs occupied by each type of independently encoded UCI, a ratio of the total number of bits of this type of UCI (including the number of cyclic redundancy check (CRC)) to the total number of bits of uplink data is used to determine a proportion of REs occupied by this type of UCI in all REs of the PUSCH. Meanwhile, considering that the reliability requirement of UCI transmission is higher than the reliability requirement of data transmission, when calculating this proportion, different code rate compensation factors Poffset are introduced for different UCI. In addition, in order to ensure uplink data transmission, the UCI may not occupy all REs. In the standard, this is achieved by introducing a higher-layer signaling configuration parameter (a), where the parameter is used to limit an upper limit of the number of REs occupied by each type of UCI.

In the case of the PUSCH carrying no uplink data, since the information bit of the data is 0, the calculation manner used in the case of the PUSCH carrying uplink data is not applicable. In this case, since there is no need to indicate a modulation order and code rate of data transmission, it is considered to use a modulation and coding scheme (MCS) field in downlink control information (DCI) for scheduling the PUSCH to indicate a reference code rate and modulation order. In summary, when the PUSCH does not carry uplink data, the number of REs occupied by each type of UCI is directly calculated according to the total number of bits of the UCI, the reference code rate, the modulation order, and the code rate compensation factor.

The PUSCH introduces high-order modulation and other factors, resulting in the reliability of PUSCH transmission lower than that of PUCCH transmission. Therefore, in order to ensure the reliability of UCI transmission on the PUSCH, different code rate compensation factors are defined for different UCI. That is, more REs are allocated to these UCI, where the number of bits of these UCI are the same. This improves the reliability of UCI transmission by reducing the code rate of the UCI. If the DCI for scheduling the PUSCH includes a code rate-compensation-factor indication field, the UE is semi-statically configured with a set through higher-layer signaling and then a code rate compensation factor is dynamically indicated to the UE via the DCI for scheduling the PUSCH. If the DCI for scheduling the PUSCH does not include the code rate-compensation-factor indication field, the UE uses $\beta^{ARQ\text{-}ACK}$, $\beta^{CSI\text{-}1}$, and $\beta^{CSI\text{-}2}$ configured by the higher layer as code rate compensation factors for the HARQ-ACK, the CSI Part 1, and the CSI Part 2, respectively.

After the UCI is subjected to the channel coding and the rate matching, the bit sequence is modulated according to a modulation scheme indicated by the DCI. In NR, when the UCI is transmitted on the PUSCH, the modulation scheme of the UCI is the same as that of the data, and after modulation, it is necessary to map the modulated information to physical resources.

For the case where the number of information bits of the HARQ-ACK is less than or equal to 2, the HARQ-ACK is mapped to the reserved REs, and information other than the CSI Part 1 (for example, the CSI Part 2 and data) can also be mapped to the reserved REs. Later, the HARQ-ACK will be mapped to the reserved REs through puncturing. Considering that the CSI Part 1 has a relatively small number of bits and its transmission is of high importance, in order to avoid impact of puncturing on the CSI Part 1, the CSI Part 1 is forbidden to be mapped to the reserved REs. In addition, when there is no uplink data and the UCI includes the CSI Part 1 but not the CSI Part 2, if the number of information bits of the HARQ-ACK actually transmitted is less than 2, for example, no information bit or 1 information bit, it is necessary to assume that the number of information bits of the HARQ-ACK is 2. That is, bit-adding needs to be performed to enable the number of information bits of the HARQ-ACK to reach 2. As such, the reserved REs are filled, to avoid empty RE without energy occurs in the PUSCH (to avoid the reserved REs not being transmitted), so as to ensure low peak-to-average power ratio (PAPR) characteristics of an uplink single carrier in the case of using the DFT-S-OFDM waveform. In this case, from a first data symbol of the PUSCH and following the principle of frequency domain first, the CSI Part 1 is mapped and skips the reserved REs, and then, still following the principle of frequency domain first, the CSI Part 2 is mapped.

For the case where the number of the information bits of the HARQ-ACK is greater than 2, for the HARQ-ACK and the CSI, the bit sequence after rate matching is mapped to a data symbol after a first demodulation reference signal (DMRS) of the PUSCH. Next to the DMRS, the most important HARQ-ACK is mapped, then the CSI Part 1 is mapped, and finally the CSI Part 2 is mapped, still following the principle of frequency domain first.

For each type of UCI, when mapping to a certain symbol, assume that the number of subcarriers available for mapping the UCI to the symbol is N and the number of subcarriers needed for mapping the UCI to the symbol is M. If M is greater than or equal to N, all the N subcarriers are used for the mapping of the UCI, that is, the UCI is consecutively mapped using the subcarriers of the symbol. If M is less than N, M subcarriers in the N subcarriers are used for the mapping of the UCI, where the M subcarriers are subcarriers for evenly mapping at equal intervals in the N subcarriers. In an example, M is less than N but M is greater than ceil (N/2), where the ceil represents rounding up. Because the number of occupied subcarriers is greater than half of all the available subcarriers of the symbol, the M subcarriers are the first M subcarriers in the N subcarriers, that is, the UCI is still consecutively mapped using the subcarriers of the symbol.

In autonomous uplink (AUL) transmission of Fe-licensed assisted access (FeLAA), the base station configures time domain resources that can be used for AUL transmission through radio resource control (RRC) and dynamically activates the time domain resources through DCI, where the DCI dynamically indicates frequency domain resources that can be used by the UE on the time domain resources. After receiving DCI activation signaling, the UE transmits the PUSCH on the AUL resources. The PUSCH carries UCI, where the UCI includes indication information for demodulating the PUSCH, which, for example, includes an AUL cell-radio network temporary identifier (C-RNTI), an HARQ process identifier, a redundancy version (RV), a new data indicator (NDI), a start position (which occupies 1 bit and can be symbol 0 or symbol 1) of the PUSCH, an end position (which occupies 1 bit and can be symbol 12 or symbol 13) of the PUSCH, and channel occupancy time (COT) sharing indication. In addition, the UCI includes a CRC of 16 bits, which is used for the base station to confirm whether the UCI is received correctly.

In mapping of the uplink data, for simplicity, the data is always mapped from symbol 0. If the start position of the PUSCH is symbol 1 and the end position of the PUSCH is symbol 12, the UE does not transmit symbol 0 and symbol 13 through puncturing. The UE does not transmit symbol 0 or symbol 13, to leave gaps of LBT for other UEs, so as to better realize multi-user multiplexing transmission.

In the NR-U system, CG uplink transmission is also supported, which is represented by CG-PUSCH in the disclosure. The CG-PUSCH can carry CG-UCI, where the CG-UCI includes indication information for demodulating the CG-PUSCH. For example, the CG-UCI may include at least the following information: the HARQ process identifier, the RV, the NDI, and the COT sharing indication.

When the PUCCH and the CG-PUSCH overlap in the time domain, the UCI can be carried on the CG-PUSCH for transmission. In NR-U, it is currently determined that the maximum number of independently coded UCI that can be multiplexed on the CG-PUSCH is 3.

On the CG-PUSCH in the NR-U system, the UCI that currently need to be multiplexed includes: the CG-UCI, the HARQ-ACK, the CSI Part 1, and the CSI Part 2. However, according to the current conclusion, the maximum number of independently coded UCI that can be multiplexed on the CG-PUSCH is 3. That is, there is no clear solution to indicate how to multiplex the above UCI (4 pieces) onto the CG-PUSCH for transmission.

FIG. 1 is a schematic flow chart illustrating a transmission method for UCI according to implementations. The method is executed by a UE, which can be a smart phone, a mobile station, or a terminal device. As illustrated in FIG. 1, the method begins at 101.

At 101, the UE maps target UCI to a PUSCH.

It is noted that, the target UCI includes at least two types of UCI, and the at least two types of UCI are encoded using joint encoding.

The at least two types of UCI included in the target UCI are at least two of CG-UCI, HARQ-ACK, CSI Part 1, and CSI Part 2.

The joint encoding can be various, which is not limited herein.

At 102, the UE transmits the PUSCH on CG uplink resources.

According to the technical solution of the disclosure, the at least two types of UCI are encoded into the target UCI using the joint encoding, and then the target UCI is mapped to the PUSCH, and the PUSCH is transmitted on the CG uplink resources. The target UCI obtained via the joint encoding only occupies one UCI resource in the PUSCH but includes two types of UCI. In this way, the PUSCH can carry the remaining two UCI resources. As such, in the technical solution of the disclosure, all UCI resources (four types of UCI) can be carried.

In at least one technical solution, the at least two types of UCI are encoded using the joint encoding as follows.

At least two of the CG-UCI, the HARQ-ACK, the CSI Part 1, and the CSI Part 2 in the target UCI are encoded using the joint encoding, where the CG-UCI is used for demodulating the PUSCH.

In at least one technical solution, the at least two types of UCI are encoded using the joint encoding as follows.

The CG-UCI and first UCI in the target UCI are encoded using the joint encoding, where the first UCI is one of the HARQ-ACK, the CSI Part 1, or the CSI Part 2.

In the implementation, a first solution of encoding the at least two types of UCI using the joint encoding is as follows. The CG-UCI and the CSI Part 1 are encoded using the joint encoding as follows.

The CG-UCI and the CSI Part 1 are encoded using a Polar code if a sum of the number of bits of the CG-UCI and the number of bits of the CSI Part 1 is greater than a first set bit number (i.e., first threshold).

The CG-UCI and the CSI Part 1 are encoded using a short code if the sum of the number of bits of the CG-UCI and the number of bits of the CSI Part 1 is less than or equal to the first set bit number.

The short code includes but is not limited to: an RM code or repetitive codes.

In an example, the first set bit number is 11.

In the first solution of the implementation, a CRC of the joint encoding of the CG-UCI and the CSI Part 1 is a CRC used in independent encoding of the CSI Part 1 or a CRC used in independent encoding of the CG-UCI.

In the first solution of the implementation, REs occupied by the joint encoding are determined as follows.

Resources occupied by the joint encoding are determined according to a first code rate compensation factor used in the independent encoding of the CSI Part 1.

Alternatively, the resources occupied by the joint encoding are determined according to the first code rate compensation factor and a first offset value used in the independent encoding of the CSI Part 1.

In the implementation, a second solution of encoding the at least two types of UCI using the joint encoding is as follows. The CG-UCI and the HARQ-ACK are encoded using the joint encoding as follows.

The CG-UCI and the HARQ-ACK are encoded using a Polar code if a sum of the number of bits of the CG-UCI and the number of bits of the HARQ-ACK is greater than a first set bit number.

The CG-UCI and the HARQ-ACK are encoded using a short code if the sum of the number of bits of the CG-UCI and the number of bits of the HARQ-ACK is less than or equal to the first set bit number.

In the second solution of the implementation, a CRC of the joint encoding of the CG-UCI and the HARQ-ACK is a CRC used in independent encoding of the HARQ-ACK or a CRC used in independent encoding of the CG-UCI.

In the second solution of the implementation, REs occupied by the joint encoding are determined as follows.

Resources occupied by the joint encoding are determined according to a second code rate compensation factor used in the independent encoding of the HARQ-ACK; or the resources occupied by the joint encoding are determined according to the second code rate compensation factor and a second offset value used in the independent encoding of the HARQ-ACK.

In the second solution of the implementation, the joint encoding of the CG-UCI and the HARQ-ACK is determined according to the number of information bits of the HARQ-ACK.

In the second solution of the implementation, the CG-UCI includes N bits for transmitting the HARQ-ACK if the number of the information bits of the HARQ-ACK is less than or equal to a second set bit number (i.e., second threshold) N, where N is an integer greater than or equal to 0.

In the second solution of the implementation, if the number of information bits of the HARQ-ACK actually transmitted is less than N, among the N bits of the CG-UCI, bits that are not used for transmitting the HARQ-ACK are used for transmitting placeholder information. In other words, if the number of the information bits of the HARQ-ACK actually transmitted is less than N, bit-adding needs to be performed such as adding bit 0 to enable the number of information bits of the HARQ-ACK to reach N, to avoid ambiguity at the receiving side and the transmitting side.

In an example, the second set bit number N is 2.

In a solution, the target UCI is mapped to the PUSCH as follows. A bit sequence of at least one of the HARQ-ACK, the target UCI, and the CSI Part 2 after subjected to rate matching is mapped to a data symbol after a first DMRS of the PUSCH, where a mapping order of the bit sequence is the HARQ-ACK, the target UCI, and the CSI Part 2, and the target UCI includes the CG-UCI and the CSI Part 1. The number of the information bits of the HARQ-ACK is greater than the second set bit number N. If the target UCI and the HARQ-ACK are included, the mapping order of the bit sequence is the HARQ-ACK and the target UCI; if the target UCI and the CSI Part 2 are included, the mapping order of the bit sequence is the target UCI and the CSI Part 2.

In a solution, the target UCI is mapped to the PUSCH as follows. REs are reserved before the UCI is mapped, and the bit sequence of the target UCI and the CSI Part 2 (if any) after rate matching are mapped to the data symbol after the first DMRS of the PUSCH. The mapping order of the bit sequence is: the target UCI and the CSI Part 2, where the target UCI is not mapped to the reserved REs but the CSI Part 2 is mapped to the reserved REs. The target UCI includes the CG-UCI and the CSI Part 1. Then, the HARQ-ACK is mapped to the reserved REs through puncturing. The number of the information bits of the HARQ-ACK is less than or equal to the second set bit number N.

In the implementation, a third solution of encoding the at least two types of UCI using the joint encoding is as follows. The CG-UCI and the CSI Part 2 are encoded using the joint encoding as follows.

The CG-UCI and the CSI Part 2 are encoded using a Polar code if a sum of the number of bits of the CG-UCI and the number of bits of the CSI Part 2 is greater than a first set bit number.

The CG-UCI and the CSI Part 2 are encoded using a short code if the sum of the number of bits of the CG-UCI and the number of bits of the CSI Part 2 is less than or equal to the first set bit number.

In the third solution of the implementation, a CRC of the joint encoding of the CG-UCI and the CSI Part 2 is a CRC used in independent encoding of the CSI Part 2 or a CRC used in independent encoding of the CG-UCI.

In the third solution of the implementation, REs occupied by the joint encoding are determined as follows.

Resources occupied by the joint encoding are determined according to a third code rate compensation factor used in the independent encoding of the CSI Part 2.

Alternatively, the resources occupied by the joint encoding are determined according to the third code rate compensation factor and a third offset value used in the independent encoding of the CSI Part 2.

In the implementation, a fourth solution of encoding the at least two types of UCI using the joint encoding is as follows. The HARQ-ACK and the CSI Part 1 are encoded using the joint encoding as follows.

The HARQ-ACK and the CSI Part 1 are encoded using a Polar code if a sum of the number of bits of the HARQ-ACK and the number of bits of the CSI Part 1 is greater than a first set bit number.

The HARQ-ACK and the CSI Part 1 are encoded using a short code if the sum of the number of bits of the HARQ-ACK and the number of bits of the CSI Part 1 is less than or equal to the first set bit number.

In the fourth solution of the implementation, a CRC of the joint encoding is a CRC used in independent encoding of the CSI Part 1 or a CRC used in independent encoding of the HARQ-ACK.

In the fourth solution of the implementation, REs occupied by the joint encoding are determined as follows.

Resources occupied by the joint encoding are determined according to a first code rate compensation factor used in the independent encoding of the CSI Part 1.

Alternatively, the resources occupied by the joint encoding are determined according to a second code rate compensation factor used in the independent encoding of the HARQ-ACK.

Alternatively, the resources occupied by the joint encoding are determined according to both the third code rate compensation factor used in the independent encoding of the HARQ-ACK and the second code rate compensation factor used in the independent encoding of the CSI Part 1.

In the first solution, the second solution, the third solution, the CRC used in the independent encoding of the CG-UCI is configured by a higher layer, is determined according to a radio network temporary identifier (RNTI) corresponding to DCI for activating the CG uplink resources, or is determined according to a configured scheduling-RNTI (CS-RNTI).

Figure 2:
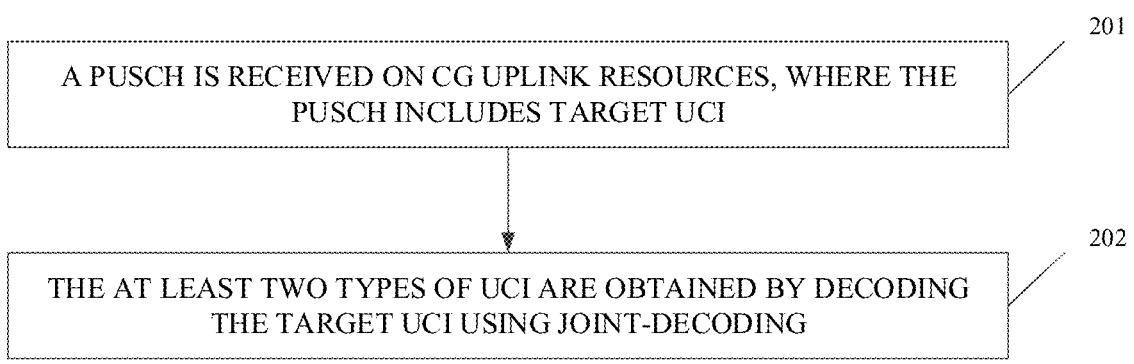
FIG. 2 is a schematic flow chart illustrating a transmission method for UCI according to implementations.
Figure 3:
FIG. 3 is a schematic diagram illustrating a network architecture according to implementations.
Figure 4:
FIG. 4 is a schematic diagram illustrating a network architecture according to implementations.

Compared with the technical solution implemented in the UE as illustrated in FIG. 1, implementations further provide a transmission method for UCI implemented in a network device or a second UE. Referring to FIG. 3 and FIG. 4, FIG. 3 is a schematic diagram illustrating a coupling between a UE and a network device, and FIG. 4 is a schematic diagram illustrating a coupling between a first device and a second device. The method illustrated in FIG. 2 may be executed by the network device illustrated in FIG. 3 or executed by the second device illustrated in FIG. 4. When executed by the second device illustrated in FIG. 4, the PUSCH may be a physical sidelink shared channel (PSSCH). As illustrated in FIG. 2, the method begins at 201.

At 201, a PUSCH is received on CG uplink resources, where the PUSCH includes target UCI, the target UCI includes at least two types of UCI, and the at least two types of UCI are encoded using joint encoding.

The at least two types of UCI included in the target UCI are at least two of CG-UCI, HARQ-ACK, CSI Part 1, and CSI Part 2.

At 202, the at least two types of UCI are obtained by decoding the target UCI using joint-decoding.

In a solution, the at least two types of UCI are encoded using the joint encoding as follows.

At least two of the CG-UCI, the HARQ-ACK, the CSI Part 1, and the CSI Part 2 in the target UCI are encoded using the joint encoding, where the CG-UCI is used for demodulating the PUSCH.

In a solution, the at least two types of UCI are encoded using the joint encoding as follows.

The CG-UCI and first UCI in the target UCI are encoded using the joint encoding, where the first UCI is one of the HARQ-ACK, the CSI Part 1, or the CSI Part 2.

In the implementation, a first solution of encoding the at least two types of UCI using the joint encoding is as follows. The CG-UCI and the CSI Part 1 are obtained by decoding the target UCI using the joint-decoding as follows.

The CG-UCI and the CSI Part 1 are obtained by decoding the target UCI using a Polar code if a sum of the number of bits of the CG-UCI and the number of bits of the CSI Part 1 is greater than a first set bit number.

The CG-UCI and the CSI Part 1 are obtained by decoding the target UCI using a short code if the sum of the number of bits of the CG-UCI and the number of bits of the CSI Part 1 is less than or equal to the first set bit number.

The short code includes but is not limited to: an RM code or repetitive codes.

In an example, the first set bit number is 11.

In a first solution of the implementation, a CRC of the target UCI is a CRC used in independent encoding of the CSI Part 1 or a CRC used in independent encoding of the CG-UCI.

In the first solution of the implementation, REs occupied by the joint encoding are determined as follows.

Resources occupied by the joint encoding are determined according to a first code rate compensation factor used in the independent encoding of the CSI Part 1.

Alternatively, the resources occupied by the joint encoding are determined according to the first code rate compensation factor and a first offset value used in the independent encoding of the CSI Part 1.

In the implementation, a second solution of encoding the at least two types of UCI using the joint encoding is as follows. The CG-UCI and the HARQ-ACK are obtained by decoding the target UCI using the joint-decoding as follows.

The CG-UCI and the HARQ-ACK are obtained by decoding the target UCI using a Polar code if a sum of the number of bits of the CG-UCI and the number of bits of the HARQ-ACK is greater than a first set bit number.

The CG-UCI and the HARQ-ACK are obtained by decoding the target UCI using a short code if the sum of the number of bits of the CG-UCI and the number of bits of the HARQ-ACK is less than or equal to the first set bit number.

In the second solution, a CRC used in the joint encoding of the target UCI is a CRC used in independent encoding of the HARQ-ACK or a CRC used in independent encoding of the CG-UCI.

In the second solution, REs occupied by the joint encoding are determined as follows.

Resources occupied by the joint encoding are determined according to a second code rate compensation factor used in the independent encoding of the HARQ-ACK; or the resources occupied by the joint encoding are determined according to the second code rate compensation factor and a second offset value used in the independent encoding of the HARQ-ACK.

In the second solution, the joint encoding of the CG-UCI and the HARQ-ACK is determined according to the number of information bits of the HARQ-ACK.

In the second solution, the CG-UCI includes N bits for transmitting the HARQ-ACK if the number of the information bits of the HARQ-ACK is less than or equal to a second set bit number N, where N is an integer greater than or equal to 0.

In the second solution, if the number of information bits of the HARQ-ACK actually transmitted is less than N, among the N bits of the CG-UCI, bits that are not used for transmitting the HARQ-ACK are used for transmitting placeholder information.

In at least one solution, a data symbol after a first DMRS of the PUSCH is de-mapped to obtain the HARQ-ACK, the target UCI, and the CSI Part 2, where the target UCI includes the CG-UCI and the CSI Part 1. If the target UCI and the HARQ-ACK are included, the data symbol after the first DMRS of the PUSCH is de-mapped to obtain the HARQ-ACK and the target UCI; if the target UCI and the CSI Part 2 are included, the data symbol after the first DMRS of the PUSCH is de-mapped to obtain the target UCI and the CSI Part 2.

In a solution, the data symbol after the first DMRS of the PUSCH is de-mapped to obtain the target UCI and the CSI Part 2 (if any). The target UCI is not mapped to the reserved REs but the CSI Part 2 is mapped to the reserved REs. The target UCI includes the CG-UCI and the CSI Part 1. Then, the HARQ-ACK is mapped to the reserved REs through puncturing. The number of the information bits of the HARQ-ACK is less than or equal to the second set bit number N.

In the implementation, a third solution of encoding the at least two types of UCI using the joint encoding is as follows.

The CG-UCI and the CSI Part 2 are obtained by decoding the target UCI using the joint-decoding as follows.

The CG-UCI and the CSI Part 2 are obtained by decoding the target UCI using a Polar code if a sum of the number of bits of the CG-UCI and the number of bits of the CSI Part 2 is greater than a first set bit number.

The CG-UCI and the CSI Part 2 are obtained by decoding the target UCI using a short code if the sum of the number of bits of the CG-UCI and the number of bits of the CSI Part 2 is less than or equal to the first set bit number.

In the third solution, a CRC of the target UCI is a CRC used in independent encoding of the CSI Part 2 or a CRC used in independent encoding of the CG-UCI.

In the third solution, REs occupied by the joint encoding are determined as follows.

Resources occupied by the joint encoding are determined according to a third code rate compensation factor used in the independent encoding of the CSI Part 2.

Alternatively, the resources occupied by the joint encoding are determined according to the third code rate compensation factor and a third offset value used in the independent encoding of the CSI Part 2.

In the implementation, a fourth solution of encoding the at least two types of UCI using the joint encoding is as follows. The HARQ-ACK and the CSI Part 1 are obtained by decoding the target UCI using the joint-decoding as follows.

The HARQ-ACK and the CSI Part 1 are obtained by decoding the target UCI using a Polar code if a sum of the number of bits of the HARQ-ACK and the number of bits of the CSI Part 1 is greater than a first set bit number.

The HARQ-ACK and the CSI Part 1 are obtained by decoding the target UCI using a short code if the sum of the number of bits of the HARQ-ACK and the number of bits of the CSI Part 1 is less than or equal to the first set bit number.

In the fourth solution, a CRC of the joint encoding is a CRC used in independent encoding of the CSI Part 1 or a CRC used in independent encoding of the HARQ-ACK.

In the fourth solution, REs occupied by the joint encoding are determined as follows.

Resources occupied by the joint encoding are determined according to a second code rate compensation factor used in the independent encoding of the CSI Part 1.

Alternatively, the resources occupied by the joint encoding are determined according to a third code rate compensation factor used in the independent encoding of the HARQ-ACK.

Alternatively, the resources occupied by the joint encoding are determined according to both the third code rate compensation factor used in the independent encoding of the HARQ-ACK and the second code rate compensation factor used in the independent encoding of the CSI Part 1.

In the first solution, second solution, or third solution, the CRC used in the independent encoding of the CG-UCI configured by a higher layer is sent, or the CRC used in the independent encoding of the CG-UCI determined according to an RNTI corresponding to DCI for activating the CG uplink resources is sent.

Figure 5:
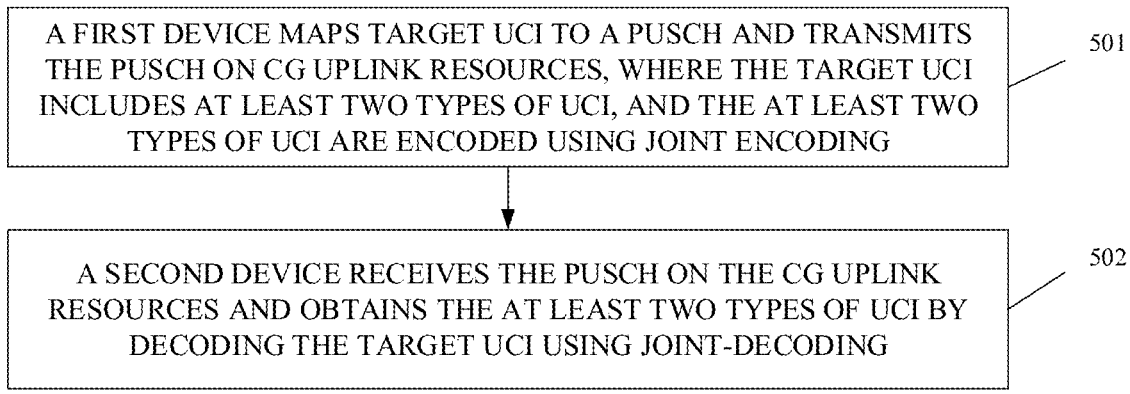
FIG. 5 is a schematic flow chart illustrating a transmission method for UCI according to implementations.

FIG. 5 is a schematic flow chart illustrating a transmission method for UCI according to implementations. The method can be implemented via the framework illustrated in FIG. 3 or FIG. 4 and the method begins at 501.

At 501, a first device maps target UCI to a PUSCH and transmits the PUSCH on CG uplink resources, where the target UCI includes at least two types of UCI, and the at least two types of UCI are encoded using joint encoding.

At 502, a second device receives the PUSCH on the CG uplink resources and obtains the at least two types of UCI by decoding the target UCI using joint-decoding.

For the target UCI, the joint encoding, and the decoding, reference can be made to the description of the implementation illustrated in FIG. 1 or FIG. 2. The description of the implementation illustrated in FIG. 1 corresponds to the operation performed by the first device of the implementation illustrated in FIG. 5. The description of the implementation illustrated in FIG. 2 corresponds to the operation performed by the second device in the implementation illustrated in FIG. 5.

Figure 6:
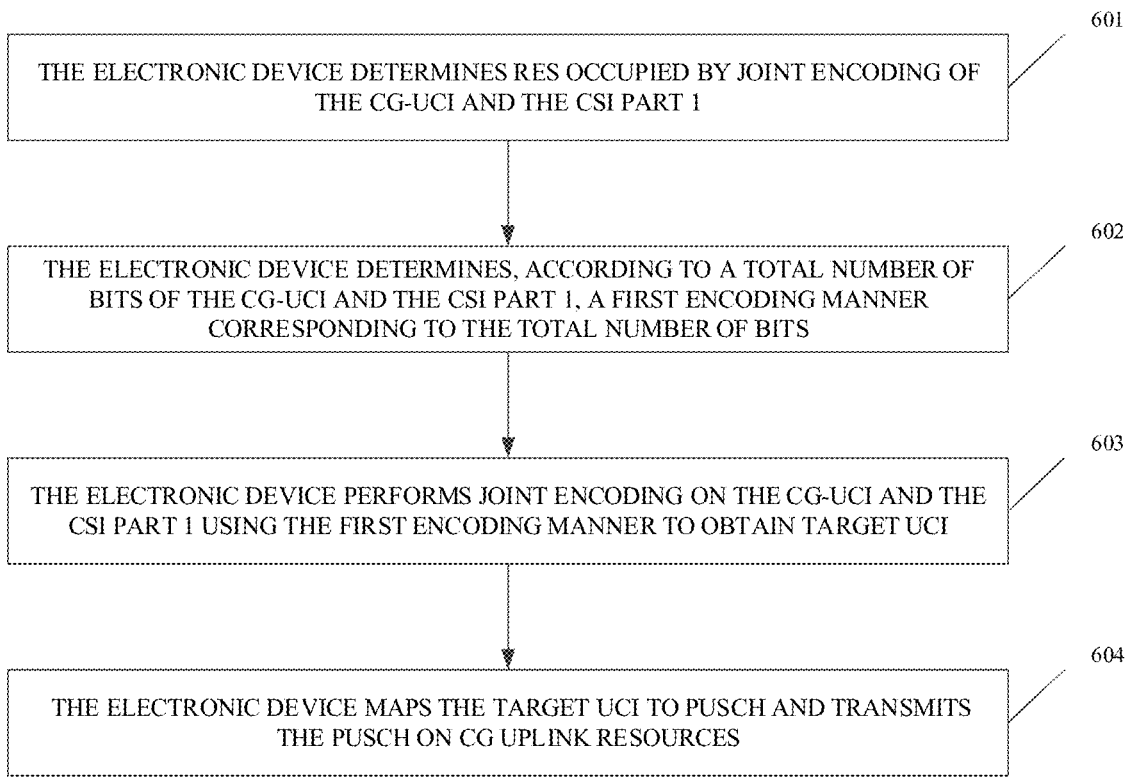
FIG. 6 is a schematic flow chart illustrating a transmission method for UCI according to implementations.

FIG. 6 is a schematic flow chart illustrating a transmission method for UCI according to implementations. The method is executed by an electronic device. In the method, the target UCI includes CG-UCI and CSI Part 1. As illustrated in FIG. 6, the method begins at 601.

At 601, the electronic device determines REs occupied by joint encoding of the CG-UCI and the CSI Part 1.

In an implementation manner of operation 601, the electronic device determines the REs occupied by the joint encoding of the CG-UCI and the CSI Part 1 according to a first code rate compensation factor used in independent encoding of the CSI Part 1.

For example, REs occupied by the independent encoding of the CSI Part 1 correspond to code rate 1, and the REs occupied by the joint encoding of the CG-UCI and the CSI Part 1 also correspond to code rate 1. For another example, the REs occupied by the independent encoding of the CSI Part 1 correspond to code rate 1 and the REs occupied by the joint encoding of the CG-UCI and the CSI Part 1 correspond to code rate 2, where code rate 1 and code rate 2 are almost equal. The above "almost equal" are defined as follows. When the absolute value of the difference between code rate 1 and code rate 2 is less than or equal to 0.2, it is determined that code rate 1 and code rate 2 are almost equal; otherwise, it is determined that code rate 1 and code rate 2 are not equal.

In another implementation manner of operation 601, the electronic device determines the REs occupied by the joint encoding of the CG-UCI and the CSI Part 1 according to the first code rate compensation factor and a first offset value used in the independent encoding of the CSI Part 1.

The above first offset value may be a preset value. In practice, the first offset value may be determined through a list. The first offset value is described in the following.

For example, the REs occupied by the independent encoding of the CSI Part 1 correspond to code rate 1 and the REs occupied by the joint encoding of the CG-UCI and the CSI Part 1 correspond to code rate 1+Δ, where Δ is obtained according to the first offset value. One way to obtain Δ is: Δ=the first offset value and another way to obtain Δ is: Δ=the first offset value*an offset coefficient. For example, the REs occupied by the independent encoding of the CSI Part 1 correspond to code rate 1 which is obtained according to the first code rate compensation factor, and the REs occupied by the joint encoding of the CG-UCI and the CSI Part 1 correspond to code rate 2 which is obtained according to the first code rate compensation factor and the first offset value.

A CRC of the joint encoding is a CRC used in the independent encoding of the CSI Part 1 or a CRC used in independent encoding of the CG-UCI. The CRC used in the independent encoding of the CG-UCI is configured by a higher layer or is determined according to an RNTI corresponding to DCI for activating the CG uplink resources.

At 602, the electronic device determines, according to a total number of bits of the CG-UCI and the CSI Part 1, a first encoding manner corresponding to the total number of bits.

The above operation 602 is implemented as follows. If the total number of the bits of the CG-UCI and the CSI Part 1 is less than or equal to a set threshold (for example, 11 bits), the first encoding manner is determined to be using an RM code. If the total number of the bits of the CG-UCI and the CSI Part 1 is greater than the set threshold (for example, 11 bits), the first encoding manner is determined to be using a Polar code.

At 603, the electronic device performs joint encoding on the CG-UCI and the CSI Part 1 using the first encoding manner to obtain target UCI.

The joint encoding in the above operation 603 may be implemented through an encoding manner of using a Polar code or an RM code.

At 604, the electronic device maps the target UCI to PUSCH and transmits the PUSCH on CG uplink resources.

In a solution, the target UCI is mapped to the PUSCH as follows.

Figure 7:
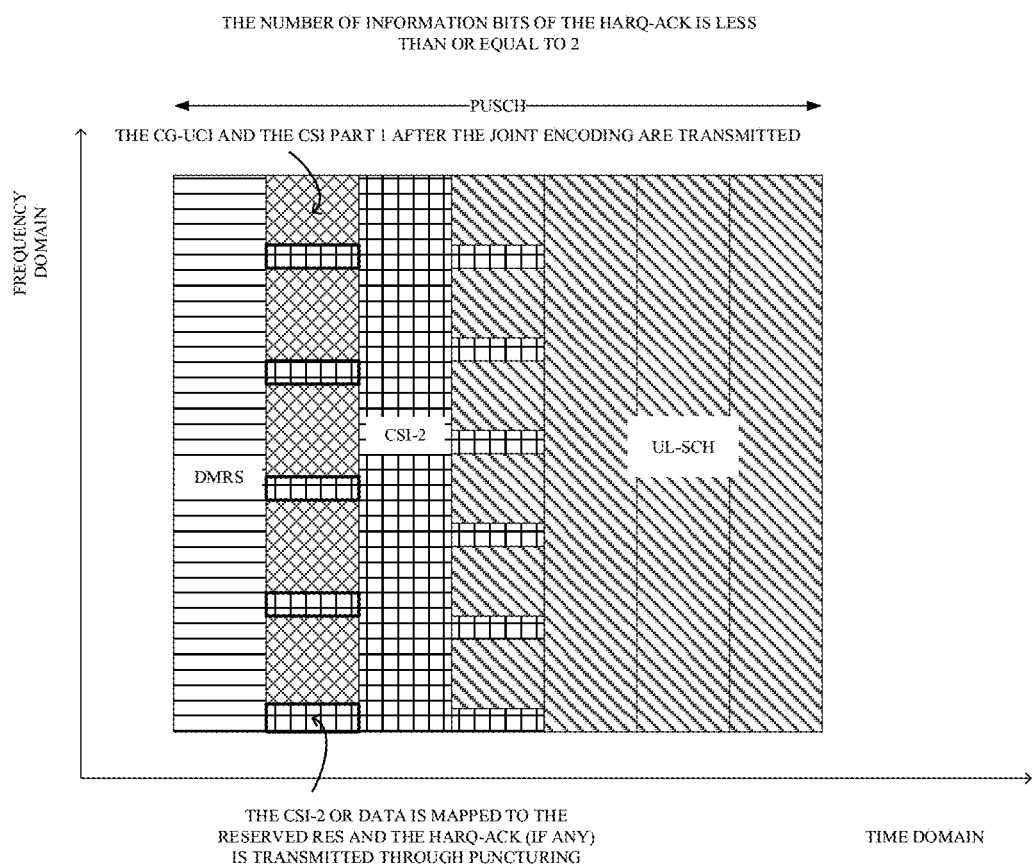
FIG. 7 is a schematic diagram illustrating a physical uplink shared channel (PUSCH) mapping.

For the case where the number of information bits of the HARQ-ACK is less than or equal to 2, the CSI Part 2 and/or data can be mapped to the reserved REs and later the HARQ-ACK will be mapped to the reserved REs through puncturing. Considering that transmission of the CG-UCI and the CSI Part 1 is of high importance, in order to avoid impact of puncturing on the CG-UCI and the CSI Part 1, the CG-UCI and the CSI Part 1 are forbidden to be mapped to the reserved REs. That is, the target UCI can be mapped to non-reserved REs of the CG uplink resources. The PUSCH mapping in the case where the number of information bits of the HARQ-ACK is less than or equal to 2 is illustrated in FIG. 7.

Figure 8:
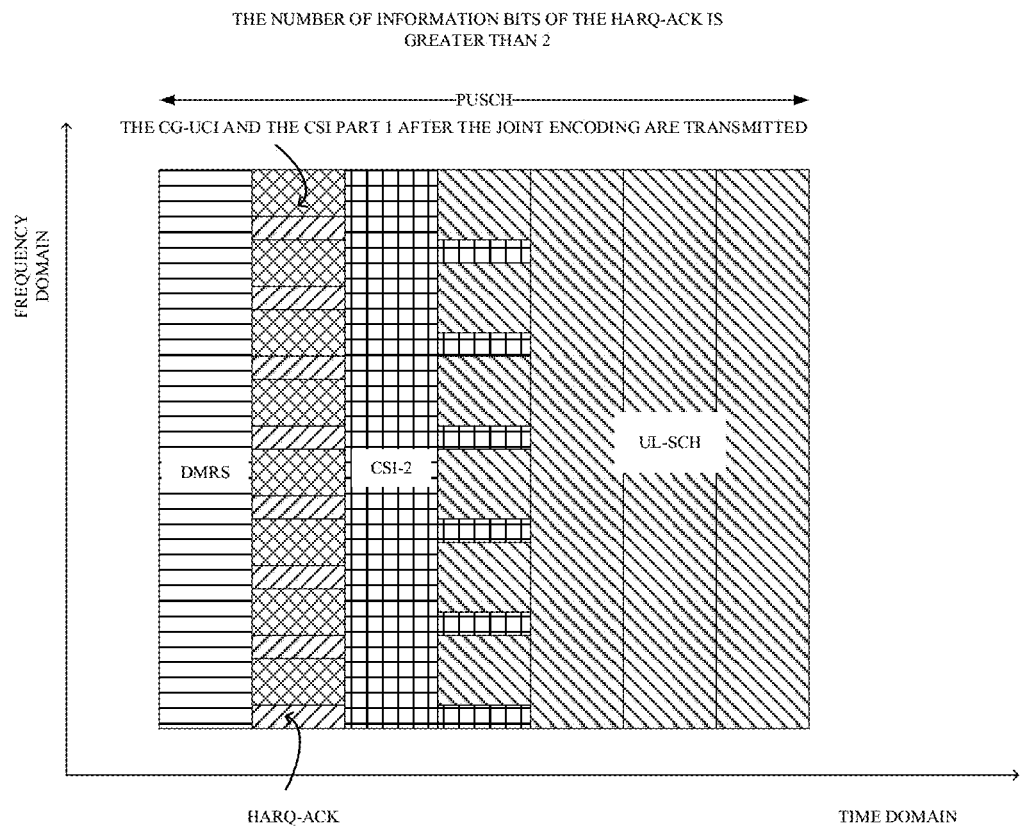
FIG. 8 is a schematic diagram illustrating a PUSCH mapping.

For the case where the number of the information bits of the HARQ-ACK is greater than 2, for the HARQ-ACK, the CSI, and the CG-UCI, the bit sequence after rate matching is mapped to the data symbol after a first DMRS of the PUSCH. The mapping order of the bit sequence can be as follows. Next to the DMRS, the most important HARQ-ACK is mapped, then the CG-UCI and the CSI Part 1 are mapped, and finally the CSI Part 2 is mapped, following the principle of frequency domain first. The PUSCH mapping in the case where the number of the information bits of the HARQ-ACK is greater than 2 is illustrated in FIG. 8.

According to the technical solution of the disclosure, the CG-UCI and the CSI Part 1 are encoded into the target UCI using the joint encoding, and then the target UCI is mapped to the PUSCH, and the PUSCH is transmitted on the CG uplink resources. The target UCI obtained via the joint encoding only occupies one UCI resource in the PUSCH but includes two types of UCI. In this way, the PUSCH can carry the remaining two UCI resources. As such, in the technical solution of the disclosure, all UCI resources (four types of UCI) can be carried.

Figure 9:
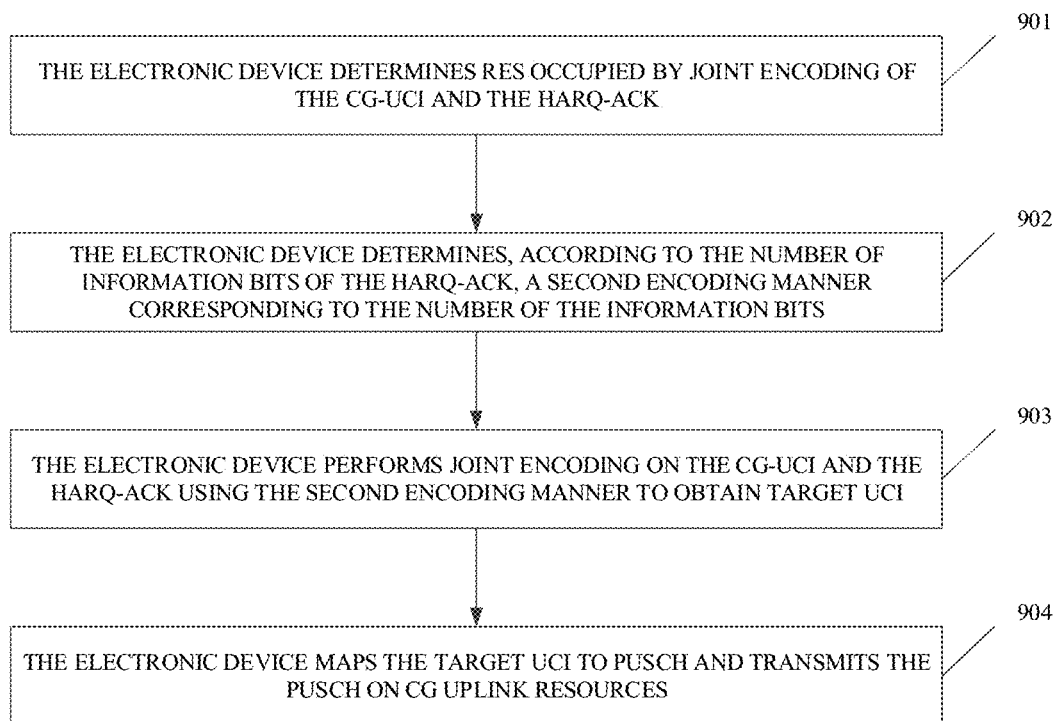
FIG. 9 is a schematic flow chart illustrating a transmission method for UCI according to implementations.

FIG. 9 is a schematic flow chart illustrating a transmission method for UCI according to implementations. The method is executed by an electronic device. In the method, the target UCI includes CG-UCI and HARQ-ACK. As illustrated in FIG. 9, the method begins at 901.

At 901, the electronic device determines REs occupied by joint encoding of the CG-UCI and the HARQ-ACK.

In an implementation manner of operation 901, the electronic device determines the REs occupied by the joint encoding of the CG-UCI and the HARQ-ACK according to a second code rate compensation factor used in independent encoding of the HARQ-ACK.

For example, REs occupied by the independent encoding of the HARQ-ACK correspond to code rate 3, and the REs occupied by the joint encoding of the CG-UCI and the HARQ-ACK also correspond to code rate 3. For another example, the REs occupied by the independent encoding of the HARQ-ACK correspond to code rate 3 and the REs occupied by the joint encoding of the CG-UCI and the HARQ-ACK correspond to code rate 4, where code rate 3 and code rate 4 are almost equal. The above "almost equal" are defined as follows. When the absolute value of the difference between code rate 3 and code rate 4 is less than or equal to 0.2, it is determined that code rate 3 and code rate 4 are almost equal; otherwise, it is determined that code rate 3 and code rate 4 are not equal.

In another implementation manner of operation 901, the electronic device determines the REs occupied by the joint encoding of the CG-UCI and the HARQ-ACK according to the second code rate compensation factor and a second offset value used in the independent encoding of the HARQ-ACK.

The above second offset value may be a preset value. In practice, the second offset value may be determined through a list. The second offset value is described in the following.

For example, the REs occupied by the independent encoding of the HARQ-ACK correspond to code rate 3 and the REs occupied by the joint encoding of the CG-UCI and the HARQ-ACK correspond to code rate 3+Δ, where Δ is obtained according to the second offset value. One way to obtain Δ is: Δ=the second offset value and another way to obtain Δ is: Δ=the second offset value*an offset coefficient. For example, the REs occupied by the independent encoding of the HARQ-ACK correspond to code rate 3 which is obtained according to the second code rate compensation factor, and the REs occupied by the joint encoding of the CG-UCI and the HARQ-ACK correspond to code rate 4 which is obtained according to the second code rate compensation factor and the second offset value.

The method further includes the following. A CRC of the joint encoding is a CRC used in the independent encoding of the HARQ-ACK or a CRC used in independent encoding of the CG-UCI. The CRC used in the independent encoding of the CG-UCI is configured by a higher layer or is determined according to an RNTI corresponding to DCI for activating the CG uplink resources.

At 902, the electronic device determines, according to the number of information bits of the HARQ-ACK, a second encoding manner corresponding to the number of the information bits.

The above operation 902 is implemented as follows. The CG-UCI includes N bits for transmitting the HARQ-ACK if the number of the information bits of the HARQ-ACK is less than or equal to a second set bit number N, where N is an integer greater than or equal to 0. Herein, if the number of information bits of the HARQ-ACK actually transmitted is less than N, among the N bits of the CG-UCI, bits that are not used for transmitting the HARQ-ACK are used for transmitting placeholder information (i.e., placeholder bits with no actual meaning).

The second encoding manner can be using a Polar code or an RM code.

At 903, the electronic device performs joint encoding on the CG-UCI and the HARQ-ACK using the second encoding manner to obtain target UCI.

The joint encoding in the above operation 903 may be implemented through an encoding manner of using a Polar code or an RM code.

The above operation 903 can be replaced with the following operation.

At 903-1, the CG-UCI and the HARQ-ACK are encoded using the joint encoding when the number of the information bits of the HARQ-ACK is greater than the second set bit number N.

At 904, the electronic device maps the target UCI to PUSCH and transmits the PUSCH on CG uplink resources.

In a solution, the target UCI is mapped to the PUSCH as follows.

Figure 10:
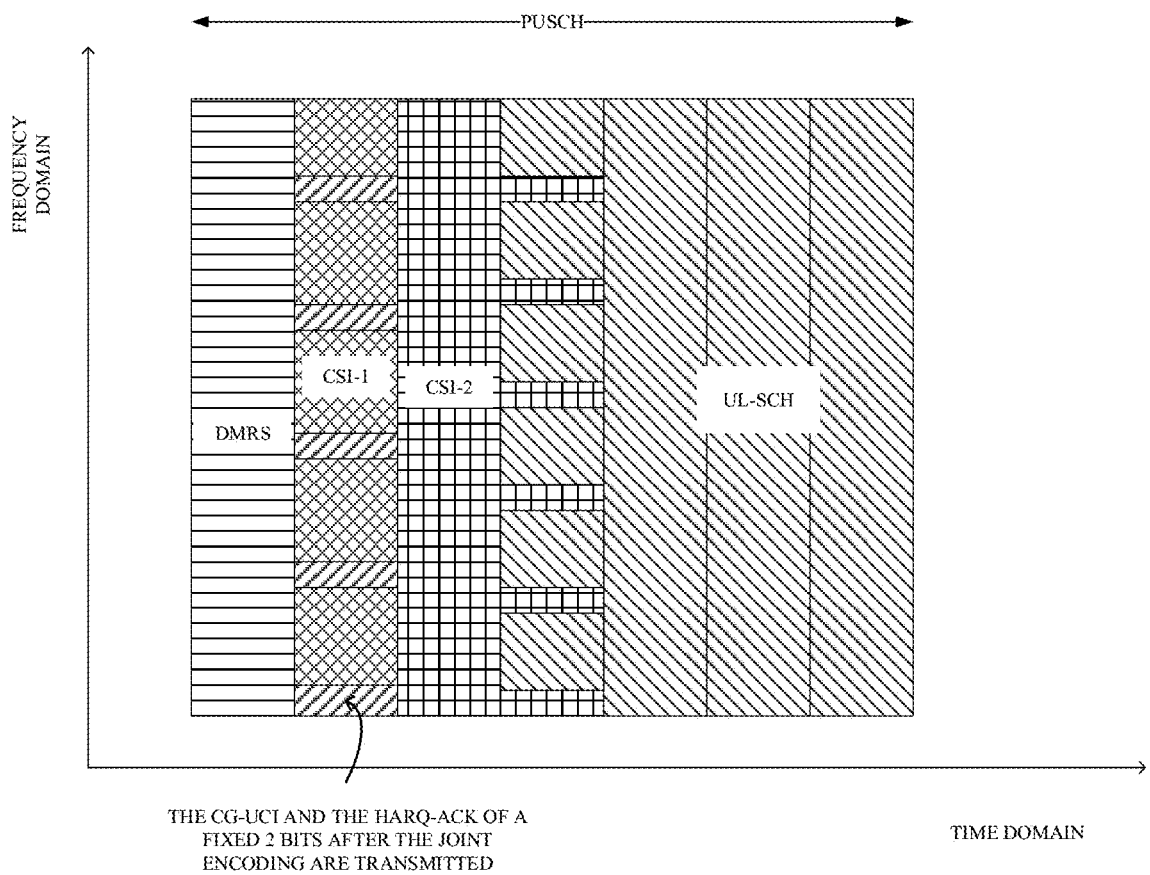
FIG. 10 is a schematic diagram illustrating a PUSCH mapping.

For the case where the number of information bits of the HARQ-ACK is less than or equal to 2, the HARQ-ACK is included in the CG-UCI. For example, the HARQ-ACK is added to the end of the CG-UCI. Assuming that the CG-UCI is of 26 bits and the HARQ-ACK is of 2 bits, 2 bits are added after 26 bits and 28 bits are obtained. In an example, the CG-UCI includes the HARQ-ACK of 2 bits. If the number of information bits of the HARQ-ACK actually transmitted is less than 2, for example, no information bit or 1 information bit, it is necessary to assume that the number of information bits of the HARQ-ACK is 2. That is, bit-adding needs to be performed to enable the number of information bits of the HARQ-ACK to reach 2. For the CG-UCI (including the HARQ-ACK) and the CSI, the bit sequence after rate matching is mapped to the data symbol after a first DMRS of the PUSCH. Next to the DMRS, the most important CG-UCI (including the HARQ-ACK) is mapped, then the CSI Part 1 is mapped, and finally the CSI Part 2 is mapped, following the principle of frequency domain first. The PUSCH mapping in the case where the number of information bits of the HARQ-ACK is less than or equal to 2 is illustrated in FIG. 10.

In another solution, the target UCI is mapped to the PUSCH as follows.

Figure 11:
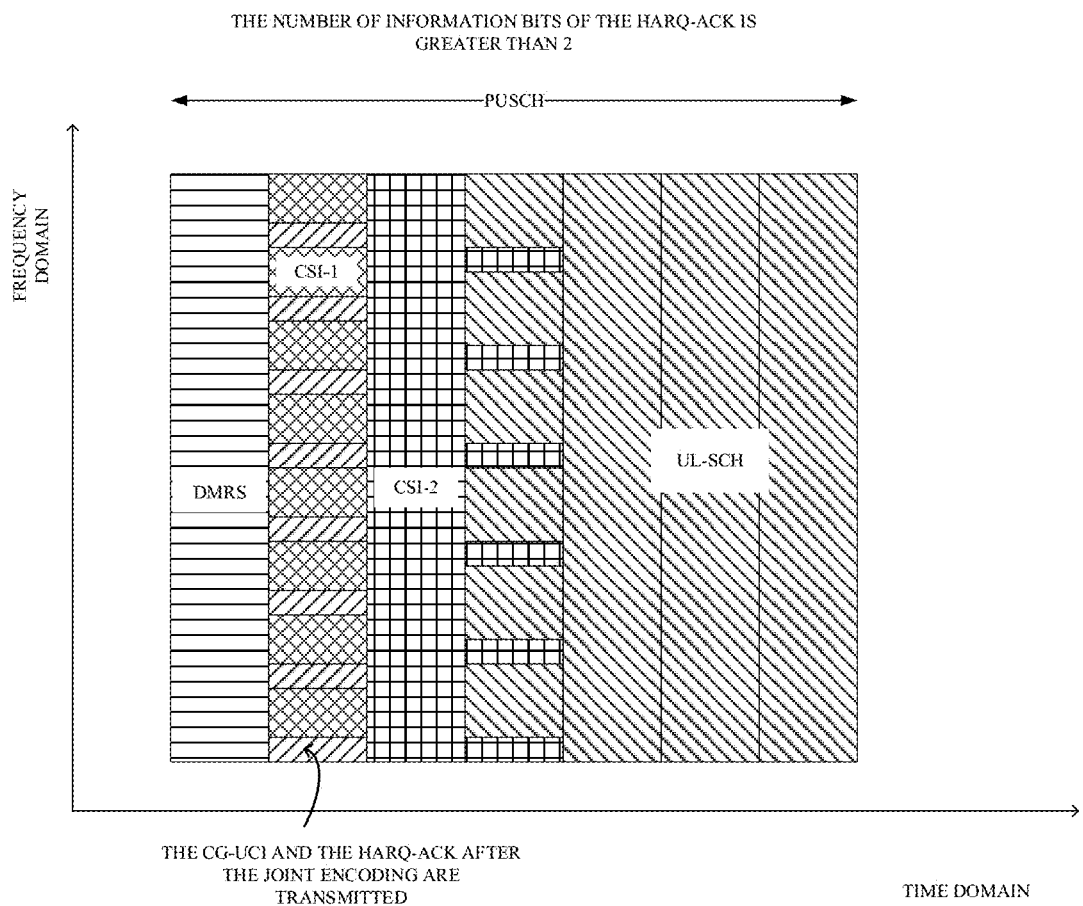
FIG. 11 is a schematic diagram illustrating a PUSCH mapping.

For the case where the number of the information bits of the HARQ-ACK is greater than 2, for the HARQ-ACK, the CG-UCI, and the CSI, the bit sequence after rate matching is mapped to the data symbol after the first DMRS of the PUSCH. Next to the DMRS, the most important HARQ-ACK and the CG-UCI are mapped, then the CSI part 1 is mapped, and finally the CSI Part 2 is mapped, following the principle of frequency domain first. The PUSCH mapping in the case where the number of the information bits of the HARQ-ACK is greater than 2 is illustrated in FIG. 11.

According to the technical solution of the disclosure, the CG-UCI and the HARQ-ACK are encoded into the target UCI using the joint encoding, and then the target UCI is mapped to the PUSCH, and the PUSCH is transmitted on the CG uplink resources. The target UCI obtained via the joint encoding only occupies one UCI resource in the PUSCH but includes two types of UCI. In this way, the PUSCH can carry the remaining two UCI resources. As such, in the technical solution of the disclosure, all UCI resources (four types of UCI) can be carried.

Figure 12:
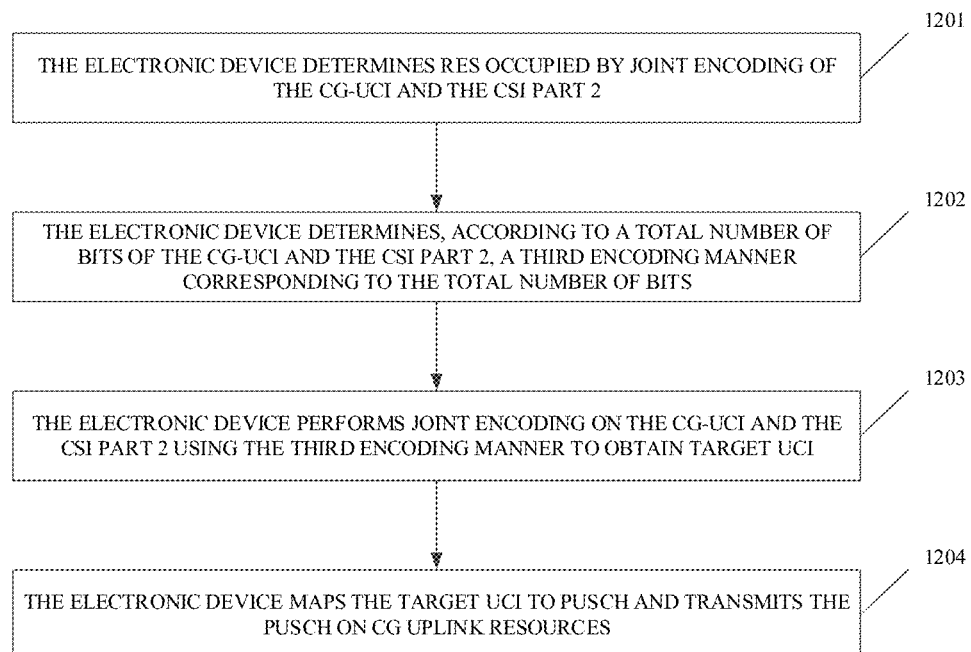
FIG. 12 is a schematic flow chart illustrating a transmission method for UCI according to implementations.

FIG. 12 is a schematic flow chart illustrating a transmission method for UCI according to implementations. The method is executed by an electronic device. In the method, the target UCI includes CG-UCI and CSI Part 2. As illustrated in FIG. 12, the method begins at 1201.

At 1201, the electronic device determines REs occupied by joint encoding of the CG-UCI and the CSI Part 2.

In an implementation manner of operation 1201, the electronic device determines the REs occupied by the joint encoding of the CG-UCI and the CSI Part 2 according to a third code rate compensation factor used in independent encoding of the CSI Part 2.

For example, REs occupied by the independent encoding of the CSI Part 2 correspond to code rate 5, and the REs occupied by the joint encoding of the CG-UCI and the CSI Part 2 also correspond to code rate 5. For another example, the REs occupied by the independent encoding of the CSI Part 2 correspond to code rate 5 and the REs occupied by the joint encoding of the CG-UCI and the CSI Part 2 correspond to code rate 6, where code rate 5 and code rate 6 are almost equal. The above "almost equal" are defined as follows. When the absolute value of the difference between code rate 5 and code rate 6 is less than or equal to 0.2, it is determined that code rate 5 and code rate 6 are almost equal; otherwise, it is determined that code rate 5 and code rate 6 are not equal.

In another implementation manner of operation 1201, the electronic device determines the REs occupied by the joint encoding of the CG-UCI and the CSI Part 2 according to the third code rate compensation factor and a third offset value used in the independent encoding of the CSI Part 2.

The above third offset value may be a preset value. In practice, the third offset value may be determined through a list. The third offset value is described in the following.

For example, the REs occupied by the independent encoding of the CSI Part 2 correspond to code rate 5 and the REs occupied by the joint encoding of the CG-UCI and the CSI Part 2 correspond to code rate 5+Δ, where Δ is obtained according to the third offset value. One way to obtain Δ is: Δ=the third offset value and another way to obtain Δ is: Δ=the third offset value*an offset coefficient. For example, the REs occupied by the independent encoding of the CSI Part 2 correspond to code rate 5 which is obtained according to the third code rate compensation factor, and the REs occupied by the joint encoding of the CG-UCI and the CSI Part 2 correspond to code rate 6 which is obtained according to the third code rate compensation factor and the third offset value.

A CRC of the joint encoding is a CRC used in the independent encoding of the CSI Part 2 or a CRC used in independent encoding of the CG-UCI. The CRC used in the independent encoding of the CG-UCI is configured by a higher layer or is determined according to an RNTI corresponding to DCI for activating the CG uplink resources.

At 1202, the electronic device determines, according to a total number of bits of the CG-UCI and the CSI Part 2, a third encoding manner corresponding to the total number of bits.

The above operation 1202 is implemented as follows. If the total number of the bits of the CG-UCI and the CSI Part 2 is less than or equal to a set threshold (for example, 11 bits), the third encoding manner is determined to be using an RM code. If the total number of the bits of the CG-UCI and the CSI Part 2 is greater than the set threshold (for example, 11 bits), the third encoding manner is determined to be using a Polar code.

At 1203, the electronic device performs joint encoding on the CG-UCI and the CSI Part 2 using the third encoding manner to obtain target UCI.

The joint encoding in the above operation 1203 may be implemented through an encoding manner of using a Polar code or an RM code.

At 1204, the electronic device maps the target UCI to PUSCH and transmits the PUSCH on CG uplink resources.

In a solution, the target UCI is mapped to the PUSCH as follows.

Figure 13:
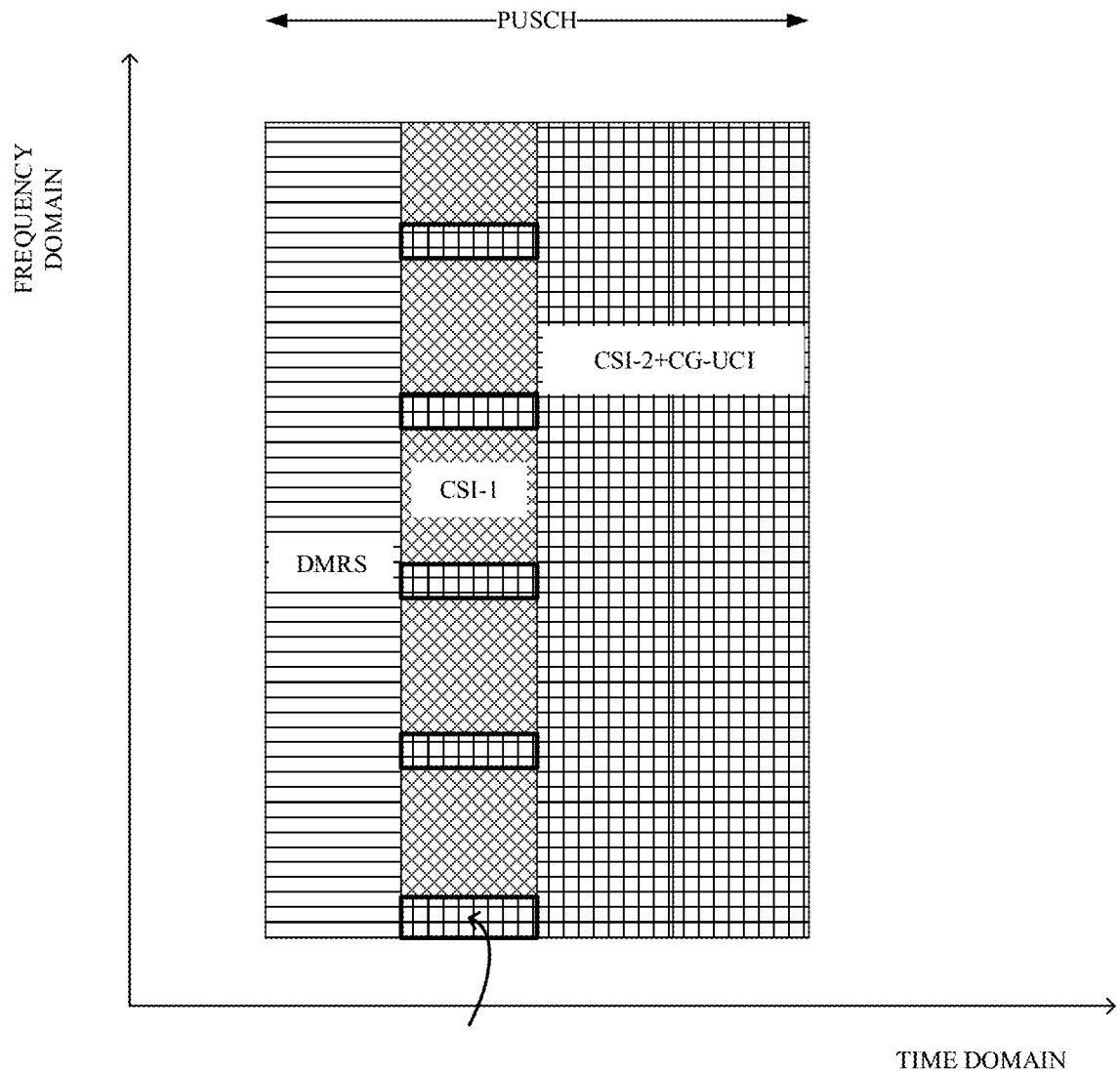
FIG. 13 is a schematic diagram illustrating a PUSCH mapping.

For the case where the number of information bits of the HARQ-ACK is less than or equal to 2, REs are reserved, the CG-UCI and the CSI Part 2 and/or data can be mapped to the reserved REs, and later the HARQ-ACK will be mapped to the reserved REs through puncturing. The PUSCH mapping in the case where the number of information bits of the HARQ-ACK is less than or equal to 2 is illustrated in FIG. 13.

In another solution, the target UCI is mapped to the PUSCH as follows.

Figure 14:
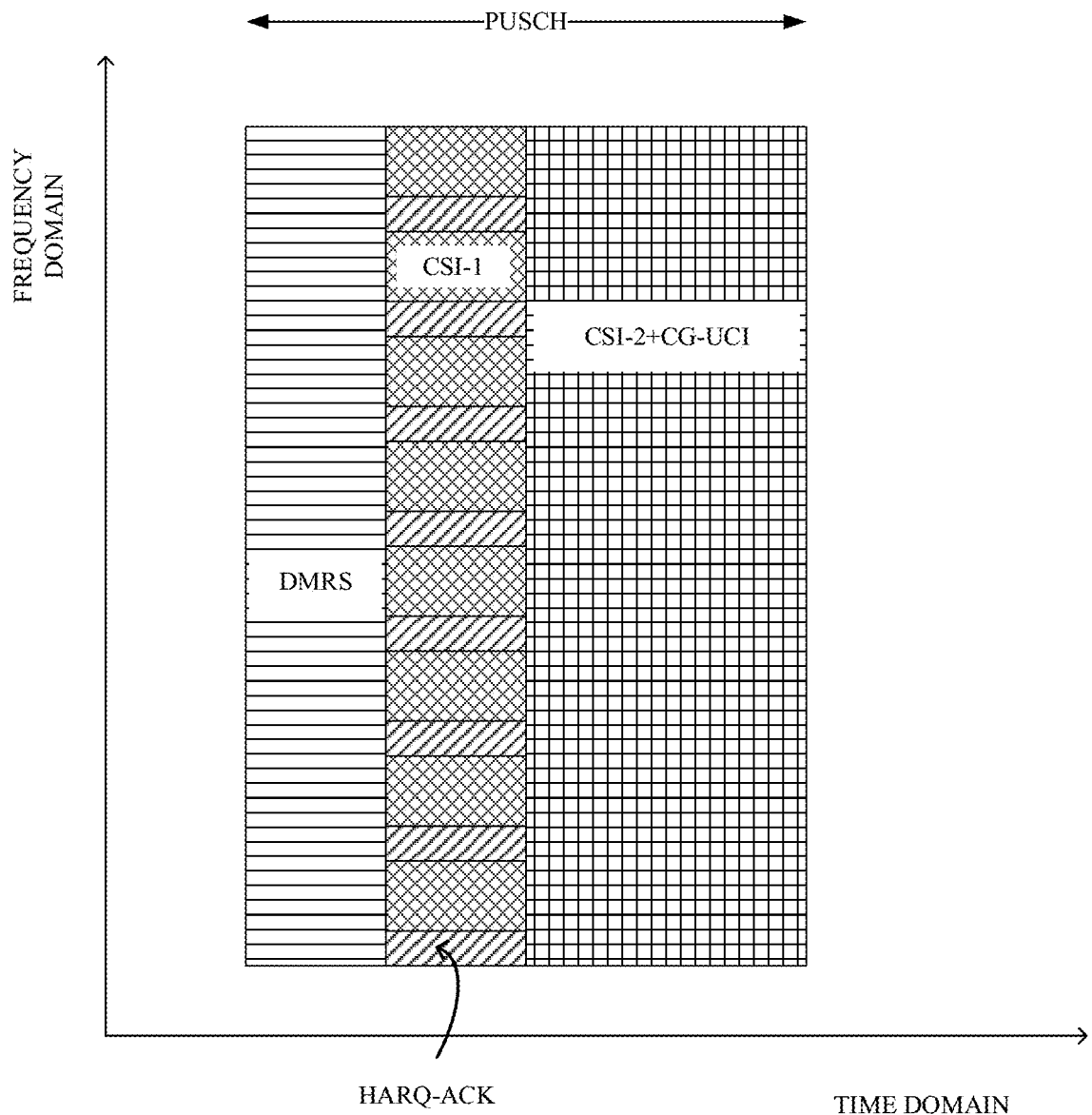
FIG. 14 is a schematic diagram illustrating a PUSCH mapping.

For the case where the number of the information bits of the HARQ-ACK is greater than 2, for the HARQ-ACK, the CSI, and the CG-UCI, the bit sequence after rate matching is mapped to the data symbol after a first DMRS of the PUSCH. Next to the DMRS, the most important HARQ-ACK is mapped, then the CSI Part 1 is mapped, and finally the CG-UCI and the CSI Part 2 are mapped, following the principle of frequency domain first. The PUSCH mapping in the case where the number of the information bits of the HARQ-ACK is greater than 2 is illustrated in FIG. 14.

According to the technical solution of the disclosure, the CG-UCI and the CSI Part 2 are encoded into the target UCI using the joint encoding, and then the target UCI is mapped to the PUSCH, and the PUSCH is transmitted on the CG uplink resources. The target UCI obtained via the joint encoding only occupies one UCI resource in the PUSCH but includes two types of UCI. In this way, the PUSCH can carry the remaining two UCI resources. As such, in the technical solution of the disclosure, all UCI resources (four types of UCI) can be carried.

Figure 15:
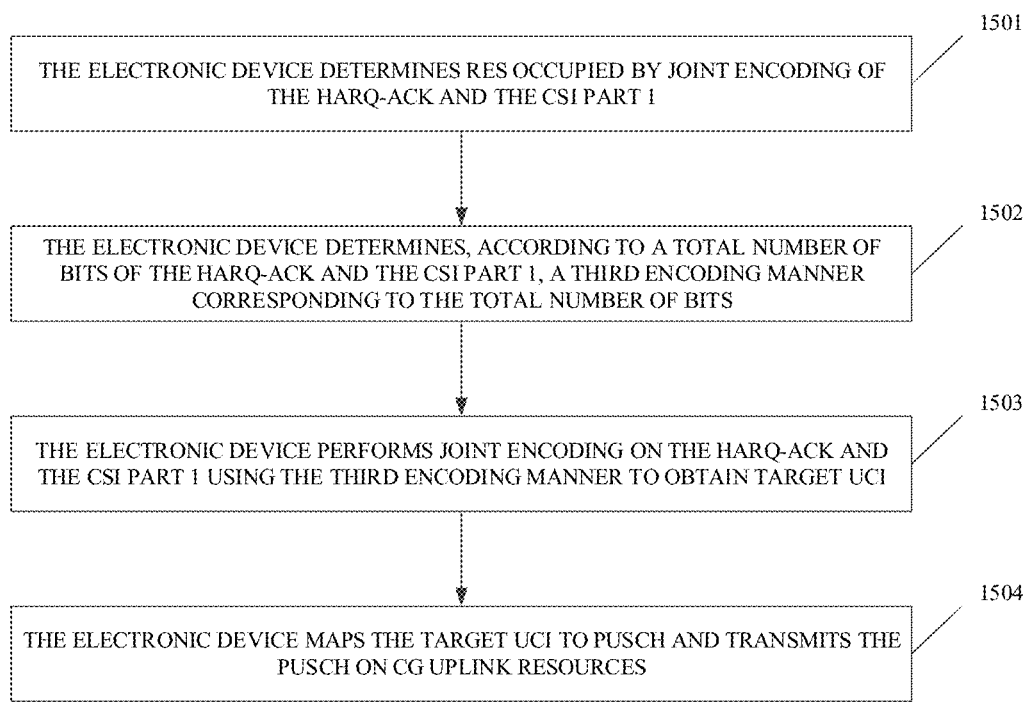
FIG. 15 is a schematic flow chart illustrating a transmission method for UCI according to implementations.

FIG. 15 is a schematic flow chart illustrating a transmission method for UCI according to implementations. The method is executed by an electronic device. In the method, the target UCI includes HARQ-ACK and CSI Part 1. As illustrated in FIG. 15, the method begins at 1501.

At 1501, the electronic device determines REs occupied by joint encoding of the HARQ-ACK and the CSI Part 1.

In an implementation manner of operation 1501, the electronic device determines the REs occupied by the joint encoding of the HARQ-ACK and the CSI Part 1 according to a first code rate compensation factor used in independent encoding of the CSI Part 1.

For example, REs occupied by the independent encoding of the CSI Part 1 correspond to code rate 1, and the REs occupied by the joint encoding of the HARQ-ACK and the CSI Part 1 also correspond to code rate 1. For another example, the REs occupied by the independent encoding of the CSI Part 1 correspond to code rate 1 and the REs occupied by the joint encoding of the HARQ-ACK and the CSI Part 1 correspond to code rate 2, where code rate 1 and code rate 2 are almost equal. The above "almost equal" are defined as follows. When the absolute value of the difference between code rate 1 and code rate 2 is less than or equal to 0.2, it is determined that code rate 1 and code rate 2 are almost equal; otherwise, it is determined that code rate 1 and code rate 2 are not equal.

In another implementation manner of operation 1501, the electronic device determines the REs occupied by the joint encoding of the HARQ-ACK and the CSI Part 1 according to a second code rate compensation factor used in independent encoding of the HARQ-ACK.

In yet another implementation manner of operation 1501, the electronic device determines the REs occupied by the joint encoding of the HARQ-ACK and the CSI Part 1 according to the second code rate compensation factor used in the independent encoding of the HARQ-ACK and the first code rate compensation factor.

A CRC of the joint encoding is a CRC used in the independent encoding of the CSI Part 1 or a CRC used in the independent encoding of the HARQ-ACK.

At 1502, the electronic device determines, according to a total number of bits of the HARQ-ACK and the CSI Part 1, a third encoding manner corresponding to the total number of bits.

The above operation 1502 is implemented as follows. If the total number of the bits of the HARQ-ACK and the CSI Part 1 is less than or equal to a set threshold (for example, 11 bits), the third encoding manner is determined to be using an RM code. If the total number of the bits of the HARQ-ACK and the CSI Part 1 is greater than the set threshold (for example, 11 bits), the third encoding manner is determined to be using a Polar code.

At 1503, the electronic device performs joint encoding on the HARQ-ACK and the CSI Part 1 using the third encoding manner to obtain target UCI.

The joint encoding in the above operation 1503 may be implemented through an encoding manner of using a Polar code or an RM code.

At 1504, the electronic device maps the target UCI to PUSCH and transmits the PUSCH on CG uplink resources.

In a solution, the target UCI is mapped to the PUSCH as follows.

Figure 16:
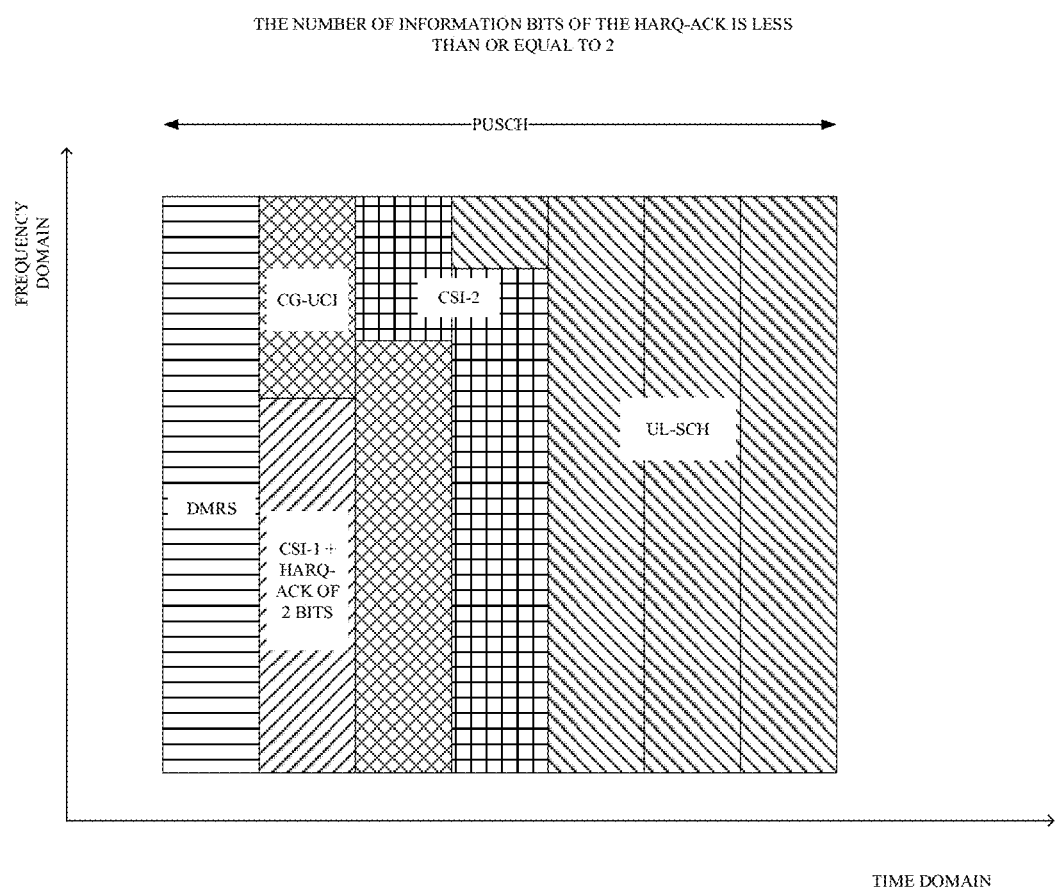
FIG. 16 is a schematic diagram illustrating a PUSCH mapping.

For the case where the number of information bits of the HARQ-ACK is less than or equal to 2, the HARQ-ACK is included in the CSI Part 1. For example, the CSI Part 1 includes the HARQ-ACK of 2 bits. If the number of information bits of the HARQ-ACK actually transmitted is less than 2, for example, no information bit or 1 information bit, it is necessary to assume that the number of information bits of the HARQ-ACK is 2. That is, bit-adding needs to be performed such as adding placeholder information to enable the number of information bits of the HARQ-ACK reach 2. For the CSI Part 1 (including the HARQ-ACK), the CG-UCI, and the CSI part 2, the bit sequence after rate matching is mapped to the data symbol after a first DMRS of the PUSCH. Next to the DMRS, the most important CSI Part 1 (including the HARQ-ACK) is mapped, then the CG-UCI is mapped, and finally the CSI Part 2 is mapped, following the principle of frequency domain first. The PUSCH mapping in the case where the number of information bits of the HARQ-ACK is less than or equal to 2 is illustrated in FIG. 16.

In another solution, the target UCI is mapped to the PUSCH as follows.

Figure 17:
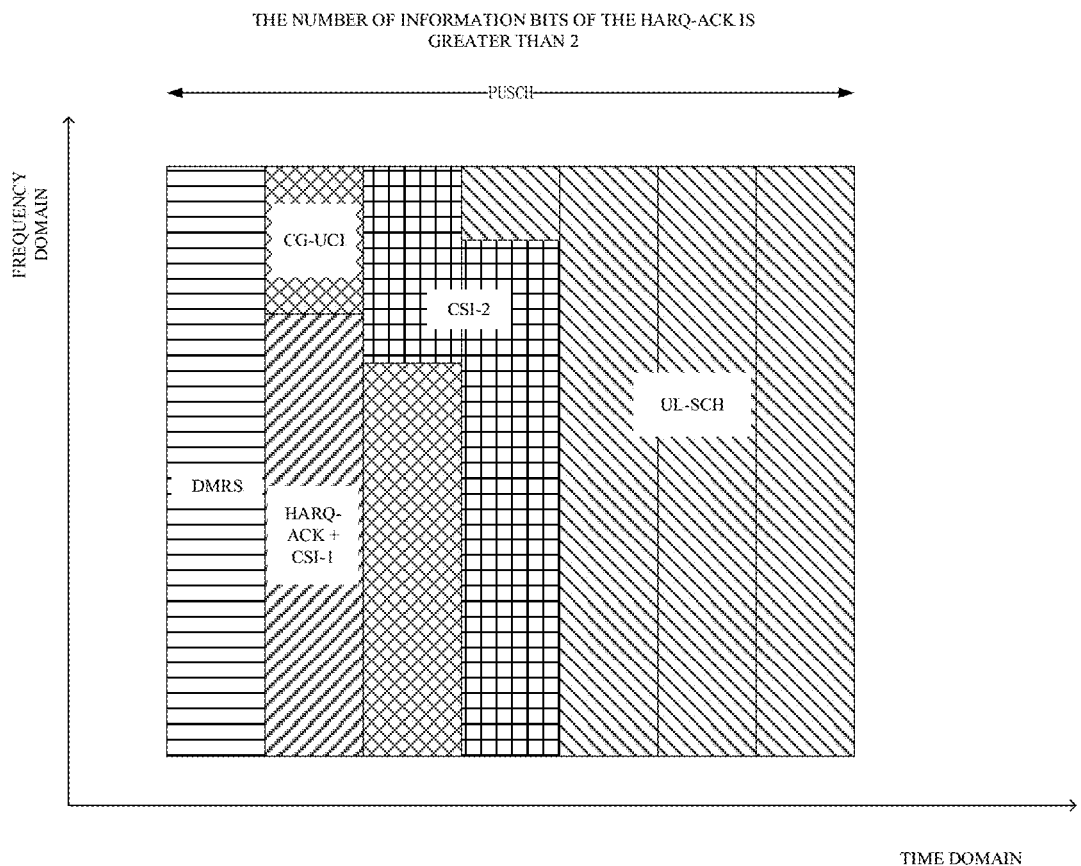
FIG. 17 is a schematic diagram illustrating a PUSCH mapping.

For the case where the number of the information bits of the HARQ-ACK is greater than 2, for the HARQ-ACK and the CSI part 1, the CG-UCI, and the CSI part 2, the bit sequence after rate matching is mapped to the data symbol after the first DMRS of the PUSCH. Next to the DMRS, the most important HARQ-ACK and the CSI Part 1 are mapped, then the CG-UCI is mapped, and finally the CSI Part 2 is mapped, also following the principle of frequency domain first. The PUSCH mapping in the case where the number of the information bits of the HARQ-ACK is greater than 2 is illustrated in FIG. 17.

According to the technical solution of the disclosure, the HARQ-ACK and the CSI Part 1 are encoded into the target UCI using the joint encoding, and then the target UCI is mapped to the PUSCH, and the PUSCH is transmitted on the CG uplink resources. The target UCI obtained via the joint encoding only occupies one UCI resource in the PUSCH but includes two types of UCI. In this way, the PUSCH can carry the remaining two UCI resources. As such, in the technical solution of the disclosure, all UCI resources (four types of UCI) can be carried.

Figure 18:
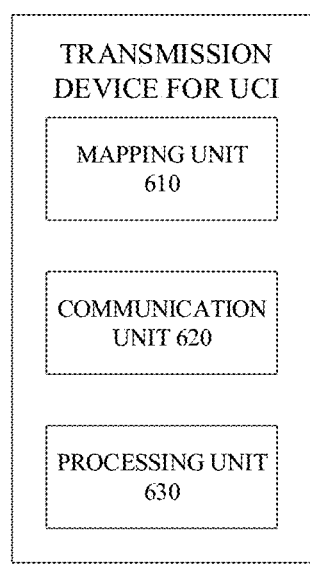
FIG. 18 is a block diagram illustrating functional units of a transmission device for UCI according to implementations.

FIG. 18 is a block diagram illustrates a transmission device for UCI. The device is set in a UE and includes a mapping unit 610 and a communication unit 620.

The mapping unit 610 is configured to map target UCI to a PUSCH.

The communication unit 620 is configured to transmit the PUSCH on CG uplink resources, where the target UCI includes at least two types of UCI, and the at least two types of UCI are encoded using joint encoding.

According to the technical solution of the disclosure, the at least two types of UCI are encoded into the target UCI using the joint encoding, and then the target UCI is mapped to the PUSCH, and the PUSCH is transmitted on the CG uplink resources. The target UCI obtained via the joint encoding only occupies one UCI resource in the PUSCH but includes two types of UCI. In this way, the PUSCH can carry the remaining two UCI resources. As such, in the technical solution of the disclosure, all UCI resources (four types of UCI) can be carried.

In at least one solution, the device further includes a processing unit 630.

The processing unit 630 is configured to encode at least two of CG-UCI, a HARQ-ACK, CSI Part 1, and CSI Part 2 in the target UCI using the joint encoding, where the CG-UCI is used for demodulating the PUSCH.

In at least one solution, the device further includes a processing unit 630.

The processing unit 630 is configured to encode the CG-UCI and first UCI in the target UCI using the joint encoding, where the first UCI is one of the HARQ-ACK, the CSI Part 1, or the CSI Part 2.

In at least one solution, the device further includes a processing unit 630.

The processing unit 630 is configured to encode the CG-UCI and the CSI Part 1 using the joint encoding.

In at least one solution, the device further includes a processing unit 630.

The processing unit 630 is configured to encode the CG-UCI and the CSI Part 1 using a Polar code if a sum of the number of bits of the CG-UCI and the number of bits of the CSI Part 1 is greater than a first set bit number, or encode the CG-UCI and the CSI Part 1 using a short code if the sum of the number of bits of the CG-UCI and the number of bits of the CSI Part 1 is less than or equal to the first set bit number.

In at least one solution, a CRC of the joint encoding is a CRC used in independent encoding of the CSI Part 1 or a CRC used in independent encoding of the CG-UCI.

In at least one solution, the device further includes a processing unit 630.

The processing unit 630 is configured to determine resources occupied by the joint encoding according to a first code rate compensation factor used in the independent encoding of the CSI Part 1, or determine the resources occupied by the joint encoding according to the first code rate compensation factor and a first offset value used in the independent encoding of the CSI Part 1.

In at least one solution, the device further includes a processing unit 630.

The processing unit 630 is configured to encode the CG-UCI and the HARQ-ACK using the joint encoding.

In at least one solution, the device further includes a processing unit 630.

The processing unit 630 is configured to encode the CG-UCI and the HARQ-ACK using a Polar code if a sum of the number of bits of the CG-UCI and the number of bits of the HARQ-ACK is greater than a first set bit number, or encode the CG-UCI and the HARQ-ACK using a short code if the sum of the number of bits of the CG-UCI and the number of bits of the HARQ-ACK is less than or equal to the first set bit number.

In at least one solution, a CRC of the joint encoding is a CRC used in independent encoding of the HARQ-ACK or a CRC used in independent encoding of the CG-UCI.

In at least one solution, the device further includes a processing unit 630.

The processing unit 630 is configured to determine resources occupied by the joint encoding according to a second code rate compensation factor used in the independent encoding of the HARQ-ACK, or determine the resources occupied by the joint encoding according to the second code rate compensation factor and a second offset value used in the independent encoding of the HARQ-ACK.

In at least one solution, the device further includes a processing unit 630.

The processing unit 630 is configured to determine the joint encoding of the CG-UCI and the HARQ-ACK according to the number of information bits of the HARQ-ACK.

In at least one solution, the device further includes a processing unit 630.

The processing unit 630 is configured to make the CG-UCI include N bits for transmitting the HARQ-ACK if the number of the information bits of the HARQ-ACK is less than or equal to a second set bit number N, where N is an integer greater than or equal to 0.

In at least one solution, the mapping unit 610 is configured to map a bit sequence of the HARQ-ACK, the target UCI, and the CSI Part 2 after subjected to rate matching to a data symbol after a first DMRS of the PUSCH, where a mapping order of the bit sequence is the HARQ-ACK, the target UCI, and the CSI Part 2, and the target UCI includes the CG-UCI and the CSI Part 1.

In at least one solution, the device further includes a processing unit 630.

The processing unit 630 is configured to encode the CG-UCI and the CSI Part 2 using the joint encoding.

In at least one solution, the device further includes a processing unit 630.

The processing unit 630 is configured to encode the CG-UCI and the CSI Part 2 using a Polar code if a sum of the number of bits of the CG-UCI and the number of bits of the CSI Part 2 is greater than a first set bit number, or encode the CG-UCI and the CSI Part 2 using a short code if the sum of the number of bits of the CG-UCI and the number of bits of the CSI Part 2 is less than or equal to the first set bit number.

In at least one solution, a CRC of the joint encoding is a CRC used in independent encoding of the CSI Part 2 or a CRC used in independent encoding of the CG-UCI.

In at least one solution, the processing unit 630 is configured to determine resources occupied by the joint encoding according to a third code rate compensation factor used in the independent encoding of the CSI Part 2, or determine the resources occupied by the joint encoding according to the third code rate compensation factor and a third offset value used in the independent encoding of the CSI Part 2.

In at least one solution, the processing unit 630 is configured to encode the HARQ-ACK and the CSI Part 1 using the joint encoding.

In at least one solution, the processing unit 630 is configured to encode the HARQ-ACK and the CSI Part 1 using a Polar code if a sum of the number of bits of the HARQ-ACK and the number of bits of the CSI Part 1 is greater than a first set bit number, or encode the HARQ-ACK and the CSI Part 1 using a short code if the sum of the number of bits of the HARQ-ACK and the number of bits of the CSI Part 1 is less than or equal to the first set bit number.

In at least one solution, a CRC of the joint encoding is a CRC used in independent encoding of the CSI Part 1 or a CRC used in independent encoding of the HARQ-ACK.

In at least one solution, the processing unit 630 is configured to determine resources occupied by the joint encoding according to a second code rate compensation factor used in the independent encoding of the CSI Part 1, determine the resources occupied by the joint encoding according to a third code rate compensation factor used in the independent encoding of the HARQ-ACK, or determine the resources occupied by the joint encoding according to both the third code rate compensation factor used in the independent encoding of the HARQ-ACK and the second code rate compensation factor used in the independent encoding of the CSI Part 1.

In at least one solution, the CRC used in the independent encoding of the CG-UCI is configured by a higher layer or is determined according to an RNTI corresponding to DCI for activating the CG uplink resources.

Figure 19:
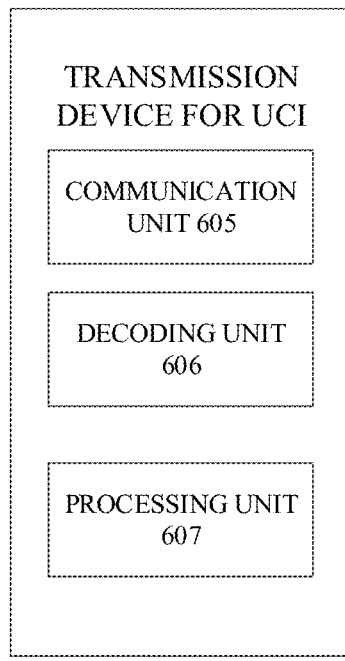
FIG. 19 is a block diagram illustrating functional units of a transmission device for UCI according to implementations.

FIG. 19 is a block diagram illustrates a transmission device for UCI. The device is set in a network device or another UE and includes a communication unit 605 and a decoding unit 606.

The communication unit 605 is configured to receive a PUSCH on CG uplink resources, where the PUSCH includes target UCI, the target UCI includes at least two types of UCI, and the at least two types of UCI are encoded using joint encoding.

The decoding unit 606 is configured to obtain the at least two types of UCI by decoding the target UCI using joint-decoding.

In at least one solution, the at least two types of UCI are encoded using the joint encoding as follows. At least two of CG-UCI, a HARQ-ACK, CSI Part 1, and CSI Part 2 in the target UCI are encoded using the joint encoding, where the CG-UCI is used for demodulating the PUSCH.

In at least one solution, the at least two types of UCI are encoded using the joint encoding as follows. The CG-UCI and first UCI in the target UCI are encoded using the joint encoding, where the first UCI is one of the HARQ-ACK, the CSI Part 1, or the CSI Part 2.

In the implementation, the decoding unit 606 configured to obtain the CG-UCI and the CSI Part 1 by decoding the target UCI using joint-decoding is configured to obtain the CG-UCI and the CSI Part 1 by decoding the target UCI using a Polar code if a sum of the number of bits of the CG-UCI and the number of bits of the CSI Part 1 is greater than a first set bit number, or obtain the CG-UCI and the CSI Part 1 by decoding the target UCI using a short code if the sum of the number of bits of the CG-UCI and the number of bits of the CSI Part 1 is less than or equal to the first set bit number.

The short code includes but is not limited to an RM code.

In a first solution of the implementation, a CRC of the target UCI is a CRC used in independent encoding of the CSI Part 1 or a CRC used in independent encoding of the CG-UCI.

In the first solution of the implementation, the device further includes a processing unit 607.

The processing unit 607 is configured to determine resources occupied by the joint encoding according to a first code rate compensation factor used in the independent encoding of the CSI Part 1, or determine the resources occupied by the joint encoding according to the first code rate compensation factor and a first offset value used in the independent encoding of the CSI Part 1.

In a second solution of the implementation, the decoding unit 606 configured to obtain the CG-UCI and the HARQ-ACK by decoding the target UCI using joint-decoding is configured to obtain the CG-UCI and the HARQ-ACK by decoding the target UCI using a Polar code if a sum of the number of bits of the CG-UCI and the number of bits of the HARQ-ACK is greater than a first set bit number, or obtain the CG-UCI and the HARQ-ACK by decoding the target UCI using a short code if the sum of the number of bits of the CG-UCI and the number of bits of the HARQ-ACK is less than or equal to the first set bit number.

In the second solution of the implementation, a CRC used in the joint encoding of the target UCI is a CRC used in independent encoding of the HARQ-ACK or a CRC used in independent encoding of the CG-UCI.

In the second solution of the implementation, the processing unit 607 is configured to determine resources occupied by the joint encoding according to a second code rate compensation factor used in the independent encoding of the HARQ-ACK, or determining the resources occupied by the joint encoding according to the second code rate compensation factor and a second offset value used in the independent encoding of the HARQ-ACK.

In the second solution of the implementation, the joint encoding of the CG-UCI and the HARQ-ACK is determined according to the number of information bits of the HARQ-ACK.

In the second solution of the implementation, the CG-UCI includes N bits for transmitting the HARQ-ACK if the number of the information bits of the HARQ-ACK is less than or equal to a second set bit number N, where N is an integer greater than or equal to 0.

In the second solution of the implementation, if the number of information bits of the HARQ-ACK actually transmitted is less than N, among the N bits of the CG-UCI, bits that are not used for transmitting the HARQ-ACK are used for transmitting placeholder information.

In at least one solution, the decoding unit 606 is further configured to de-map a data symbol after a first DMRS of the PUSCH to obtain the HARQ-ACK, the target UCI, and the CSI Part 2, where the target UCI includes the CG-UCI and the CSI Part 1.

In a third solution of the implementation, the decoding unit 606 configured to obtain the CG-UCI and the CSI Part 2 by decoding the target UCI using joint-decoding is configured to obtain the CG-UCI and the CSI Part 2 by decoding the target UCI using a Polar code if a sum of the number of bits of the CG-UCI and the number of bits of the CSI Part 2 is greater than a first set bit number, or obtain the CG-UCI and the CSI Part 2 by decoding the target UCI using a short code if the sum of the number of bits of the CG-UCI and the number of bits of the CSI Part 2 is less than or equal to the first set bit number.

In the third solution of the implementation, a CRC of the target UCI is a CRC used in independent encoding of the CSI Part 2 or a CRC used in independent encoding of the CG-UCI.

In the third solution of the implementation, the processing unit 607 is configured to determine resources occupied by the joint encoding according to a third code rate compensation factor used in the independent encoding of the CSI Part 2, or determine the resources occupied by the joint encoding according to the third code rate compensation factor and a third offset value used in the independent encoding of the CSI Part 2.

In a fourth solution of the implementation, the decoding unit 606 configured to obtain the HARQ-ACK and the CSI Part 1 by decoding the target UCI using joint-decoding is configured to obtain the HARQ-ACK and the CSI Part 1 by decoding the target UCI using a Polar code when a sum of the number of bits of the HARQ-ACK and the number of bits of the CSI Part 1 is greater than a first set bit number, or obtain the HARQ-ACK and the CSI Part 1 by decoding the target UCI using a short code when the sum of the number of bits of the HARQ-ACK and the number of bits of the CSI Part 1 is less than or equal to the first set bit number.

In the fourth solution of the implementation, a CRC of the joint encoding is a CRC used in independent encoding of the CSI Part 1 or a CRC used in independent encoding of the HARQ-ACK.

In the fourth solution of the implementation, the processing unit 607 is configured to determine resources occupied by the joint encoding according to a second code rate compensation factor used in the independent encoding of the CSI Part 1, determine the resources occupied by the joint encoding according to a third code rate compensation factor used in the independent encoding of the HARQ-ACK, or determine the resources occupied by the joint encoding according to both the third code rate compensation factor used in the independent encoding of the HARQ-ACK and the second code rate compensation factor used in the independent encoding of the CSI Part 1.

In the first solution, second solution, or third solution, the communication unit 605 is further configured to send the CRC used in the independent encoding of the CG-UCI configured by a higher layer, or send the CRC used in the independent encoding of the CG-UCI determined according to an RNTI corresponding to DCI for activating the CG uplink resources.

Figure 20:
FIG. 20 is a schematic structural diagram illustrating a transmission system for UCI according to implementations.

FIG. 20 is a schematic structural diagram illustrating a transmission system for UCI according to implementations. The system includes a first device and a second device.

The first device is configured to map target UCI to a PUSCH and transmit the PUSCH on CG uplink resources, where the target UCI includes at least two types of UCI, and the at least two types of UCI are encoded using joint encoding.

The second device is configured to receive the PUSCH on the CG uplink resources and obtain the at least two types of UCI by decoding the target UCI using joint-decoding.

For the structure and function of the first device, reference can be made to the description of the device implantations illustrated in FIG. 18, and for the structure and function of the second device, reference can be made to the description of the device implantations illustrated in FIG. 19.

Figure 21:
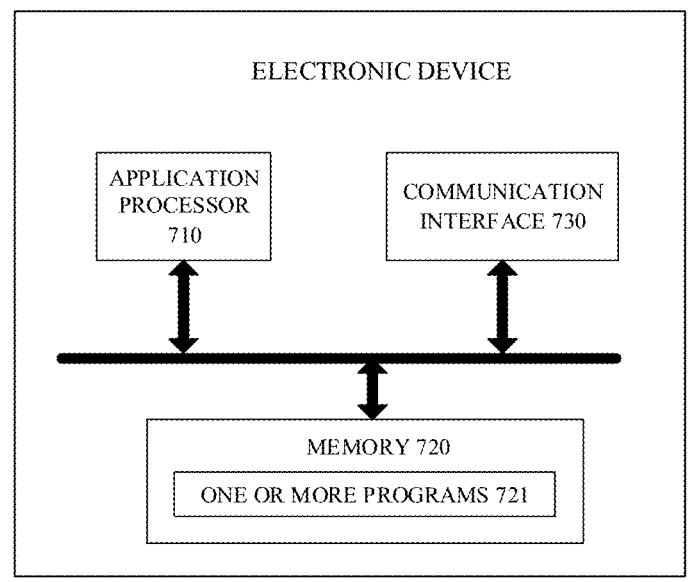
FIG. 21 is a schematic diagram illustrating a hardware structure of an electronic device according to implementations.

In accordance with the implementations of FIG. 18, FIG. 19, and FIG. 20, reference is made to FIG. 21. FIG. 21 is a schematic structural diagram illustrating an electronic device according to implementations. As illustrated in FIG. 21, the electronic device includes a processor 710, a memory 720, and a communication interface 730. The memory 720 is configured to store one or more programs 721. The one or more programs 721 are configured to be executed by the processor 710 and include instructions configured to perform the operations of the method of FIG. 1, FIG. 2, or FIG. 5.

Implementations further provide a computer storage medium. The computer storage medium is configured to store a computer program for electronic data interchange. The computer program causes a computer to execute all or part of operations of the method of the above. The computer includes an electronic device.

Implementations further provide a computer program product. The computer program product includes a non-transitory computer-readable storage medium storing a computer program. The computer program is operable to cause the computer to execute all or part of operations of the method of the above. The computer program product may be a software installation package. The computer includes an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, disk, compact disc (CD), or the like.

It will be understood by those of ordinary skill in the art that all or a part of the various methods of the implementations described above may be accomplished by means of a program to instruct associated hardware, the program may be stored in a computer readable storage, which may include a flash memory, a ROM, a RAM, disk or CD, and so on.

The implementations of the disclosure are described in detail above. Some examples are used herein to illustrate the principle and implementation manners of the disclosure. The description of the above implementations is only used to help understand the method and core idea of the disclosure. Meanwhile, for those of ordinary skill in the art, according to the idea of the disclosure, there will be changes in the implementation manner and the application scope. In summary, contents of this specification should not be construed as a limitation on the disclosure.

What is claimed is:

1. A transmission method for uplink control information (UCI), comprising:
    obtaining target UCI, wherein the target UCI comprises at least two types of UCI, the target UCI comprises configured grant UCI (CG-UCI) and hybrid automatic repeat-request acknowledgement (HARQ-ACK);
    mapping the target UCI to a physical uplink shared channel (PUSCH), wherein the CG-UCI and the HARQ-ACK are encoded using joint encoding, and a code rate compensation factor configured for use in independent encoding of the HARQ-ACK is used for determining resources occupied by the CG-UCI and the HARQ-ACK encoded using the joint encoding; and
    transmitting the PUSCH on configured grant (CG) uplink resources.

2. The method of claim 1, wherein the CG-UCI and the HARQ-ACK being encoded using the joint encoding comprises:
    the CG-UCI and the HARQ-ACK being encoded using a Polar code in response to a sum of the number of bits of the CG-UCI and the number of bits of the HARQ-ACK being greater than a set bit number; or
    the CG-UCI and the HARQ-ACK being encoded using a short code in response to the sum of the number of bits of the CG-UCI and the number of bits of the HARQ-ACK being less than or equal to the set bit number.

3. The method of claim 2, wherein the set bit number is 11.

4. The method of claim 1, wherein the code rate compensation factor is indicated via downlink control information (DCI) or configured by a higher layer.

5. A reception method for uplink control information (UCI), comprising:
    receiving a physical uplink shared channel (PUSCH) on configured grant (CG) uplink resources, the PUSCH comprising target UCI, the target UCI comprising at least two types of UCI, and the at least two types of UCI being encoded using joint encoding,
    wherein the target UCI comprises configured grant UCI (CG-UCI) and hybrid automatic repeat-request acknowledgement (HARQ-ACK), wherein the CG-UCI and the HARQ-ACK are encoded using joint encoding, and a code rate compensation factor configured for use in independent encoding of the HARQ-ACK is used for determining resources occupied by the CG-UCI and the HARQ-ACK encoded using the joint encoding; and
    obtaining the at least two types of UCI by decoding the target UCI using joint-decoding.

6. The method of claim 5, wherein the CG-UCI and the HARQ-ACK being encoded using the joint encoding comprises:
- the CG-UCI and the HARQ-ACK being encoded using a Polar code in response to a sum of the number of bits of the CG-UCI and the number of bits of the HARQ-ACK being greater than a set bit number; or
- the CG-UCI and the HARQ-ACK being encoded using a short code in response to the sum of the number of bits of the CG-UCI and the number of bits of the HARQ-ACK being less than or equal to the set bit number.

7. The method of claim 6, wherein the set bit number is 11.

8. The method of claim 5, wherein the code rate compensation factor is indicated via downlink control information (DCI) or configured by a higher layer.

9. A user equipment, comprising:
- a transceiver;
- at least one processor; and
- a memory coupled to the at least one processor and storing at least one computer executable instruction thereon,
- wherein the at least one computer executable instruction, when executed by the at least one processor, causes the at least one processor to:
- obtain target UCI, wherein the target UCI comprises at least two types of UCI, the target UCI comprises configured grant UCI (CG-UCI) and hybrid automatic repeat-request acknowledgement (HARQ-ACK);
- map the target UCI to a physical uplink shared channel (PUSCH), wherein the CG-UCI and the HARQ-ACK are encoded using joint encoding, and a code rate compensation factor configured for use in independent encoding of the HARQ-ACK is used for determining resources occupied by the CG-UCI and the HARQ-ACK encoded using the joint encoding; and
- transmit the PUSCH on configured grant (CG) uplink resources.

10. The user equipment of claim 9, wherein the CG-UCI and the HARQ-ACK being encoded using the joint encoding comprises:
- the CG-UCI and the HARQ-ACK being encoded using a Polar code in response to a sum of the number of bits of the CG-UCI and the number of bits of the HARQ-ACK being greater than a set bit number; or
- the CG-UCI and the HARQ-ACK being encoded using a short code in response to the sum of the number of bits of the CG-UCI and the number of bits of the HARQ-ACK being less than or equal to the set bit number.

11. The user equipment of claim 10, wherein the set bit number is 11.

12. The user equipment of claim 9, wherein the code rate compensation factor is indicated via downlink control information (DCI) or configured by a higher layer.

\* \* \* \* \*